(12) United States Patent
Chen et al.

(10) Patent No.: US 12,491,490 B2
(45) Date of Patent: Dec. 9, 2025

(54) EVAPORATIVE EMISSION CONTROL ARTICLES INCLUDING ACTIVATED CARBON

(71) Applicant: BASF CORPORATION, Florham Park, NJ (US)

(72) Inventors: Chen Chen, Shanghai (CN); Wolfgang Ruettinger, East Windsor, NJ (US); Steven Chin, Port Reading, NJ (US); Laif R. Alden, Feasterville, PA (US); Akash Abraham, Brooklyn, NY (US)

(73) Assignee: BASF MOBILE EMISSIONS CATALYSTS LLC, Iselin, NJ (US)

( * ) Notice: Subject to any disclaimer, the term of this patent is extended or adjusted under 35 U.S.C. 154(b) by 0 days.

(21) Appl. No.: 18/132,775

(22) Filed: Apr. 10, 2023

(65) Prior Publication Data

US 2023/0243321 A1    Aug. 3, 2023

Related U.S. Application Data

(63) Continuation of application No. 16/534,177, filed on Aug. 7, 2019, now Pat. No. 11,624,340, which is a
(Continued)

(51) Int. Cl.
*B01D 53/04*    (2006.01)
*B01J 20/20*    (2006.01)
(Continued)

(52) U.S. Cl.
CPC ........ *B01J 20/205* (2013.01); *B01D 53/0407* (2013.01); *B01J 20/20* (2013.01); *B01J 20/28026* (2013.01); *B01J 20/2803* (2013.01); *B01J 20/28045* (2013.01); *B01J 20/28066* (2013.01); *B01J 20/28071* (2013.01); *B01J 20/28073* (2013.01); *B01J 20/2808* (2013.01);
(Continued)

(58) Field of Classification Search
CPC ...... B01D 2253/102; B01D 2259/4516; B01D 53/0407; F02M 25/0854; B01J 20/205; B01J 20/20; B01J 20/28026; B01J 20/2803
See application file for complete search history.

(56) References Cited

U.S. PATENT DOCUMENTS

| 3,171,820 A | 3/1965 | Volz |
| 4,259,452 A | 3/1981 | Yukuta et al. |

(Continued)

FOREIGN PATENT DOCUMENTS

| CN | 102052713 A | 5/2011 |
| CN | 103925051 A | 7/2014 |

(Continued)

OTHER PUBLICATIONS

Petition for Post Grant Review of U.S. Pat. No. 10,323,553 dated Mar. 2, 2020, AIA Review No. PGR2020-00035, 110 pages.
(Continued)

*Primary Examiner* — Gonzalo Laguarda
(74) *Attorney, Agent, or Firm* — Lowenstein Sandler LLP

(57) ABSTRACT

The present disclosure relates to hydrocarbon emission control systems. More specifically, the present disclosure relates to substrates coated with hydrocarbon adsorptive coating compositions and evaporative emission control systems for controlling evaporative emissions of hydrocarbons from motor vehicle engines and fuel systems.

20 Claims, 14 Drawing Sheets

Related U.S. Application Data continuation of application No. PCT/CN2019/095842, filed on Jul. 12, 2019.

(51) Int. Cl.
  *B01J 20/28* (2006.01)
  *B01J 20/30* (2006.01)
  *B01J 20/32* (2006.01)
  *F02M 25/08* (2006.01)

(52) U.S. Cl.
  CPC ... *B01J 20/28083* (2013.01); *B01J 20/28092* (2013.01); *B01J 20/3042* (2013.01); *B01J 20/324* (2013.01); *F02M 25/0854* (2013.01); *F02M 25/0872* (2013.01); *B01D 2253/102* (2013.01); *B01D 2253/25* (2013.01); *B01D 2257/7022* (2013.01); *B01D 2259/4516* (2013.01); *B01J 2220/46* (2013.01); *B01J 2220/4812* (2013.01)

(56) References Cited

U.S. PATENT DOCUMENTS

| | | |
|---|---|---|
| 4,308,841 A | 1/1982 | Kingsley |
| 4,750,465 A | 6/1988 | Rediker et al. |
| 4,877,001 A | 10/1989 | Kenealy et al. |
| 5,288,307 A | 2/1994 | Goltz et al. |
| 5,658,372 A | 8/1997 | Gadkaree |
| 5,914,294 A | 6/1999 | Park et al. |
| 6,136,075 A | 10/2000 | Bragg et al. |
| 6,197,079 B1 | 3/2001 | Mori et al. |
| 6,464,761 B1 | 10/2002 | Bugli |
| 6,540,815 B1 | 4/2003 | Hiltzik et al. |
| 6,692,551 B2 | 2/2004 | Wernholm et al. |
| RE38,844 E | 10/2005 | Hiltzik et al. |
| 6,976,477 B2 | 12/2005 | Gimby et al. |
| 7,051,717 B2 | 5/2006 | Meiller et al. |
| 7,118,716 B2 | 10/2006 | Meiller et al. |
| 7,159,579 B2 | 1/2007 | Meiller et al. |
| 7,186,291 B2 | 3/2007 | Wolff |
| 7,422,628 B2 | 9/2008 | Foong et al. |
| 7,442,232 B2 | 10/2008 | White et al. |
| 7,467,620 B1 | 12/2008 | Reddy |
| 7,540,904 B2 | 6/2009 | Hoke et al. |
| 7,578,285 B2 | 8/2009 | Buelow et al. |
| 7,597,745 B2 | 10/2009 | Lebowitz et al. |
| 7,641,720 B2 | 1/2010 | Li |
| 7,708,817 B2 | 5/2010 | Hurley et al. |
| 7,737,083 B2 | 6/2010 | von Blucher et al. |
| 7,753,034 B2 | 7/2010 | Hoke et al. |
| 7,763,104 B2 | 7/2010 | Arruda et al. |
| 7,785,702 B2 | 8/2010 | Kamper et al. |
| 8,012,439 B2 | 9/2011 | Arnold et al. |
| 8,191,535 B2 | 6/2012 | Bellis et al. |
| 8,205,442 B2 | 6/2012 | Dobert et al. |
| 8,262,785 B2 | 9/2012 | Barron et al. |
| 8,372,184 B2 | 2/2013 | Zimmermann |
| 8,372,477 B2 | 2/2013 | Buelow et al. |
| 8,413,433 B2 | 4/2013 | Lupescu |
| 8,439,013 B2 | 5/2013 | Bellis |
| 8,475,569 B2 | 7/2013 | Hurley et al. |
| 8,635,852 B2 | 1/2014 | Lupescu et al. |
| 8,919,492 B2 | 12/2014 | Metzger et al. |
| 9,121,373 B2 | 9/2015 | Moyer et al. |
| 9,541,043 B2 | 1/2017 | Fedak et al. |
| 9,732,649 B2 | 8/2017 | Hiltzik et al. |
| 9,869,281 B2 | 1/2018 | Cai et al. |
| 10,323,553 B2 | 6/2019 | Hiltzik et al. |
| 10,960,342 B2 | 3/2021 | Hiltzik et al. |
| 11,161,745 B2 | 11/2021 | Mu et al. |
| 11,448,109 B2 | 9/2022 | Hiltzik et al. |
| 11,478,773 B2 | 10/2022 | Ruettinger et al. |
| 2002/0172637 A1 | 11/2002 | Chesneau et al. |
| 2004/0011197 A1 | 1/2004 | Wernholm et al. |
| 2004/0050252 A1 | 3/2004 | Wernholm et al. |
| 2004/0182240 A1 | 9/2004 | Bause et al. |
| 2004/0226440 A1 | 11/2004 | Foong et al. |
| 2005/0241479 A1 | 11/2005 | Lebowitz et al. |
| 2006/0183812 A1 | 8/2006 | Miller et al. |
| 2006/0205830 A1 | 9/2006 | Lebowitz et al. |
| 2006/0240980 A1 | 10/2006 | Hung et al. |
| 2007/0107701 A1 | 5/2007 | Buelow et al. |
| 2007/0113831 A1 | 5/2007 | Hoke et al. |
| 2008/0251053 A1 | 10/2008 | Shears et al. |
| 2008/0308075 A1 | 12/2008 | Allen et al. |
| 2009/0038477 A1 | 2/2009 | Abe et al. |
| 2009/0038777 A1 | 2/2009 | Chen et al. |
| 2013/0190542 A1 | 7/2013 | Romanos et al. |
| 2014/0044625 A1 | 2/2014 | Lupescu et al. |
| 2014/0130765 A1 | 5/2014 | Oftin et al. |
| 2014/0165542 A1 | 6/2014 | Loftin et al. |
| 2014/0305309 A1 | 10/2014 | McKenna et al. |
| 2015/0275727 A1 | 10/2015 | Hiltzik et al. |
| 2016/0237313 A1 | 8/2016 | Williams et al. |
| 2017/0067415 A1 | 3/2017 | Cai et al. |
| 2018/0043329 A1 | 2/2018 | Mazyck et al. |
| 2018/0363594 A1 | 12/2018 | Byrne et al. |
| 2019/0127227 A1 | 5/2019 | Zhao et al. |
| 2020/0147586 A1 | 5/2020 | Ruettinger et al. |

FOREIGN PATENT DOCUMENTS

| | | |
|---|---|---|
| CN | 107282011 A | 10/2017 |
| EP | 2063098 A | 5/2009 |
| WO | 2009061533 A1 | 5/2009 |
| WO | 2009129485 A2 | 10/2009 |
| WO | 2019003157 A1 | 1/2019 |

OTHER PUBLICATIONS

Ingevity South Carolina, LLC's Patent Owner's Preliminary Response dated Jun. 12, 2020, AIA Review No. PGR2020-00035, 91 pages.
Petitioner's Reply to Patent Owner's Preliminary Response dated Jul. 23, 2020, AIA Review No. PGR2020-00035, 10 pages.
Patent Owner Ingevity South Carolina, LLC's Sur-Reply dated Jul. 30, 2020, AIA Review No. PGR2020-00035, 6 pages.
Decision Denying Institution of Post-Grant Review, dated Sep. 10, 2020, AIA Review No. PGR2020-00035, 25 pages.
Petition for Post Grant Review of U.S. Pat. No. 10,323,553 dated Mar. 3, 2020, AIA Review No. PGR2020-00037, 118 pages.
Ingevity South Carolina, LLC's Patent Owner's Preliminary Response dated Jun. 12, 2020, AIA Review No. PGR2020-00037, 97 pages.
Petitioner's Reply to Patent Owner's Preliminary Response dated Jul. 31, 2020, AIA Review No. PGR2020-00037, 14 pages.
Patent Owner Ingevity South Carolina, LLC's Sur-Reply dated Aug. 7, 2020, AIA Review No. PGR2020-00037, 10 pages.
Decision Granting Institution of Post-Grant Review, dated Sep. 10, 2020, AIA Review No. PGR2020-00037, 42 pages.
"California Evaporative Emission Standards and Test Procedures for 2001 and Subsequent Model Motor Vehicles," State of California Air Resources Board, adopted Aug. 5, 1999, amended Mar. 22, 2012, 93 pages.
Extended European Search Report for Application No. 18823094.0 dated Feb. 8, 2021, 8 pages.
International Search Report and Written Opinion for International Application No. PCT/CN2019/095842 dated Oct. 6, 2019, 8 pages.
European Search Report, dated Mar. 11, 2022, on application No. 19837859.8, 14 pages.
Request for Ex Parte Reexamination of U.S. Pat. No. 11,478,773, Feb. 10, 2025, 34 pages.
Versen et al., Low Bleed Solutions Meeting LEV III/Tier 3 Evaporative Emission Standards, 2015 Tank Tech Conference, 42 pages.
Declaration of Dr. James R. Miller in Support of Request for Ex Parte Reexamination of U.S. Pat. No. 11,478,773, Feb. 6, 2025, 7 pages.
Lozano-Castello et al., Activated carbon monoliths for methane storage: influence of binder, Carbon 2002, v40(15), pp. 2817-2825.

(56) References Cited

OTHER PUBLICATIONS

Desai et al., Sustainable synthesis of green adsorbent pellets with optimal attributes of capacity, strength, and cost from powdered activated carbon, Powder Technology, 2023, v427(1), Art. 118763, 10 pages.

Liu et al., Novel zeolite/carbon monolith adsorbents for efficient $CH_4/N_2$ separation, Chemical Engineering Journal, 2021, v426, Art. 130163, 8 pages.

Yeskendir et al., From metal-organic framework powders to shaped solids: recent developments and challenges, Mater. Adv. 2021, v2, pp. 7139-7186.

Wadi et al., Formulation, adsorption performance, and mechanical integrity of triamine grafted binder-based mesoporous silica pellets for $CO_2$ capture, Powder Technology 2021, v393:257-264, pp. 257-264.

Order Granting Request Ex Parte Reexamination of U.S. Appl. No. 11/478,773 dated Apr. 21, 2025.

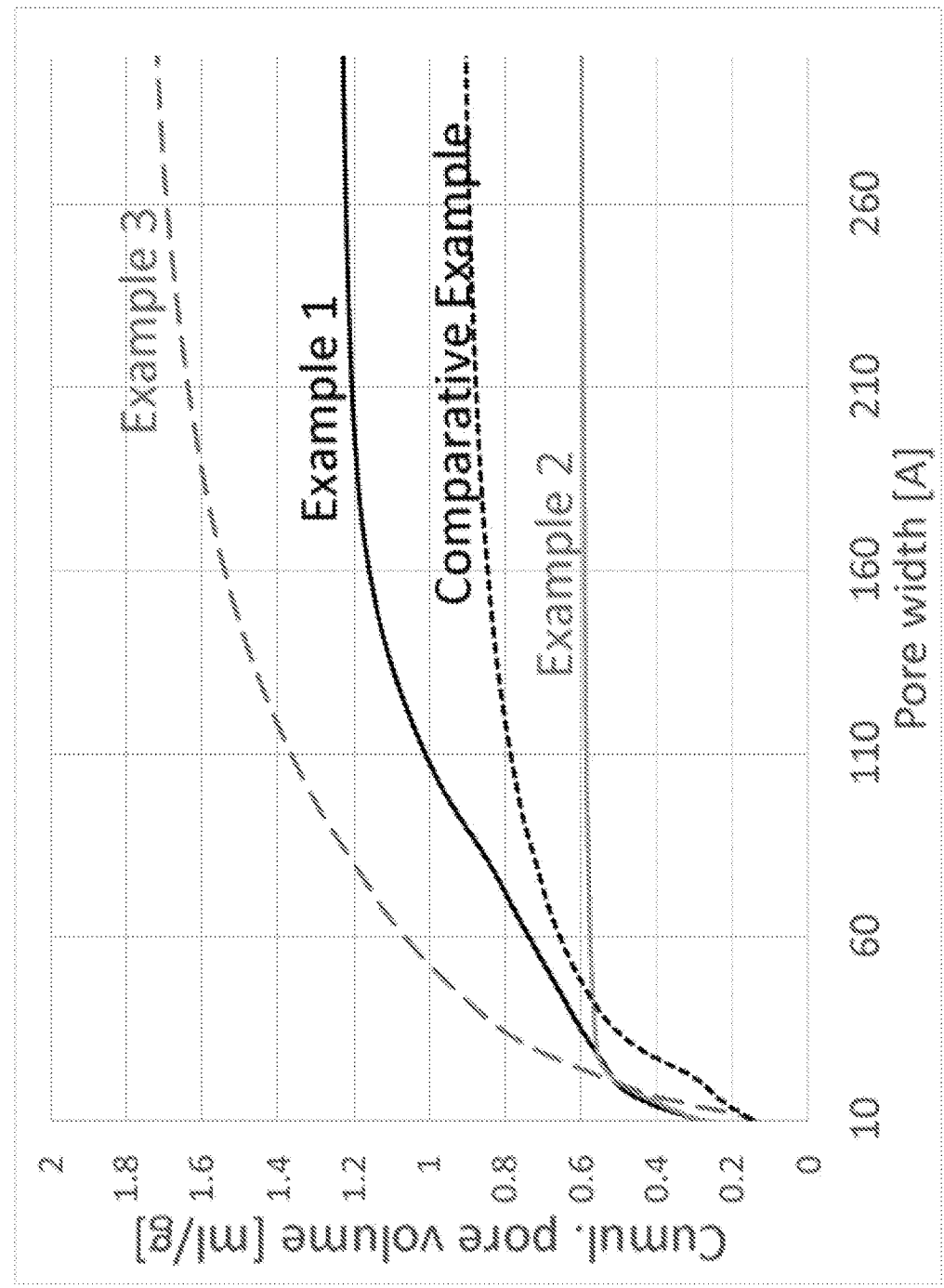

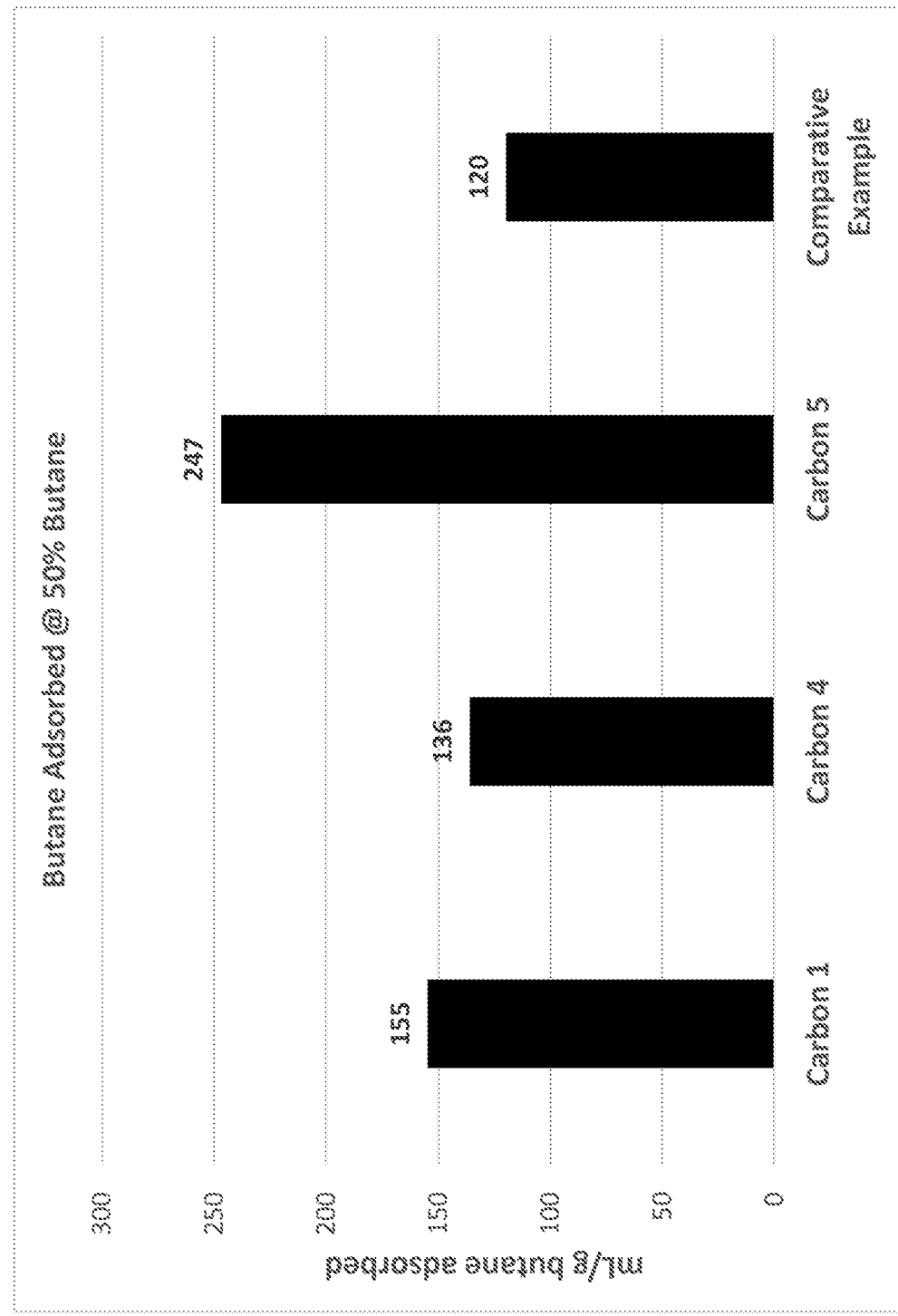

EVAPORATIVE EMISSION CONTROL ARTICLES INCLUDING ACTIVATED CARBON

CROSS REFERENCE TO RELATED APPLICATION(S)

The present application is a divisional application of U.S. Non-Provisional application Ser. No. 17/260,738, filed on Jan. 15, 2021, which is a continuation of International Application No. PCT/CN2019/095842, filed on Jul. 12, 2019, which claims the benefit of International Application No. PCT/CN2018/095773, filed on Jul. 16, 2018, the disclosures of which are hereby incorporated by reference herein in their entireties.

FIELD OF THE INVENTION

The present disclosure relates generally to hydrocarbon emission control systems. More particularly, the present disclosure relates to substrates coated with hydrocarbon adsorptive coating compositions, evaporative emission control system components, and evaporative emission control systems for controlling evaporative emissions of hydrocarbons from motor vehicle engines and fuel systems.

BACKGROUND OF THE INVENTION

Evaporative loss of gasoline fuel from the fuel systems of motor vehicles powered by internal combustion engines is a major potential contributor to atmospheric air pollution by hydrocarbons. Evaporative emissions are defined as emissions that do not originate from the exhaust system of the vehicle. The main contribution to the overall evaporative emissions of a vehicle is hydrocarbon fuel vapors originating from the fuel system and the air intake system. Canister systems that employ activated carbon to adsorb the fuel vapor emitted from the fuel systems are used to limit such evaporative emissions. Currently, all vehicles have a fuel vapor canister containing activated carbon pellets to control evaporative emissions. Activated carbon is the standard adsorbent material used in all automotive evaporative emission control technologies, which typically make use of the activated carbon as an adsorbent material to temporarily adsorb the hydrocarbons.

The activated carbon is then periodically regenerated by purge air from the intake system, which desorbs the hydrocarbons and carries them into the engine. Thus the activated carbon undergoes many thousands of adsorption/desorption cycles over the lifetime of the vehicle. During each adsorption cycle, a small amount of irreversible adsorption occurs which is not regenerated. Over the lifetime of the vehicle, this small amount of irreversible adsorption slowly increases, decreasing its overall effective adsorption capacity of the activated carbon. This phenomenon is referred to as heel or heel build.

Many fuel vapor canisters also contain an additional control device to capture fuel vapors that escape from the carbon bed during the hot side of diurnal temperature cycling. Current control devices for such emissions contain exclusively carbon-containing honeycomb adsorbents for pressure drop reasons. In such systems, the adsorbed fuel vapor is periodically removed from the activated carbon by purging the canister systems with fresh ambient air, desorbing the fuel vapor from the activated carbon and thereby regenerating the carbon for further adsorption of fuel vapor.

Exemplary U.S. patents disclosing canister-based evaporative loss control systems include U.S. Pat. Nos. 4,877,001; 4,750,465; and 4,308,841.

Institution of strict regulations for permissible quantities of hydrocarbon emissions have required progressively tighter control of the quantity of hydrocarbon emissions from motor vehicles, even during periods of disuse. During such periods (i.e., when parked), vehicle fuel systems may be subject to warm environments, which result in increased vapor pressure in the fuel tank and, consequently, the potential for evaporative loss of fuel to the atmosphere.

The aforementioned canister systems possess certain limitations in regard to capacity and performance. For example, purge air does not desorb the entire fuel vapor adsorbed on the adsorbent volume, resulting in residual hydrocarbons ("heel") that may be emitted to the atmosphere. The term "heel" as used herein refers to residual hydrocarbons generally present on an adsorbent material when the canister is in a purged or "clean" state and may result in a reduction of the adsorption capacity of the adsorbent. Bleed emissions, on the other hand, refer to emissions that escape from the adsorbent material. Bleed can occur, for example, when the equilibrium between adsorption and desorption favors desorption significantly over adsorption. Such emissions can occur when a vehicle has been subjected to diurnal temperature changes over a period of several days, commonly called "diurnal breathing losses." Certain regulations make it desirable for these diurnal breathing loss (DBL) emissions from the canister system to be maintained at very low levels. For example, as of Mar. 22, 2012, California Low Emission Vehicle Regulation (LEV-III) requires canister 2-day DBL emissions for 2001 and subsequent model motor vehicles not to exceed 20 mg as per the Bleed Emissions Test Procedure (BETP). The California BETP is performed as described in the following steps. In step 1, the canister is loaded with 40 to 80 grams per hour of fuel vapor (about 50/50 mixture with $N_2$ or air) to 2-gram breakthrough, and then purged with $N_2$ at 22.7 L/min for 300 canister bed volume exchanges. Step 1 is repeated for a total of 10 cycles. In step 2, the canister is loaded with 40 grams per hour of butane (50/50 mixture with $N_2$) to 2-gram breakthrough, and then purged according to specifications from the original equipment manufacturer representative of one drive cycle. In step 3, a fuel tank is filled to 40% capacity, and is soaked for a minimum of 6 hours to a maximum of 72 hours at about 65° F. In step 4, the canister is connected to the fuel tank, and the tank load port is connected to the canister load with the purge port capped. The canister is then soaked for a minimum of 12 hours to a maximum of 36 hours at about 65° F. In step 5, the assembly is cycled between 65° F. and 105° F. with a 12 hour ramp time to complete two diurnal cycles in 48 hours. The highest hydrocarbon emission of each 24-hour period is then reported. Bleed emission traps are currently installed in such fuel canisters to achieve such low bleed emission values. These traps are consisting of extruded carbon monoliths, and are meant to absorb the 100-500 mg of emissions from the fuel canister in the two-day diurnal cycle.

Previously disclosed is a method of limiting the hydrocarbon emissions under stringent DBL conditions by routing the fuel vapor through an initial adsorbent volume and then at least one subsequent adsorbent volume prior to venting to the atmosphere, wherein the initial adsorbent volume has a higher adsorption capacity than the subsequent adsorbent volume. See U.S. Pat. No. RE38,844.

Also previously disclosed is an evaporative emission control canister system device with high purge efficiency and moderate butane working capacity having an initial, and at least one subsequent, adsorbent volume and with an effective butane working capacity (BWC) of less than 3 g/dL, a g-total BWC of between 2 grams and 6 grams, and two-day DBL emissions of no more than 20 mg at no more than about 210 liters of purge, applied after a 40 g/hr butane loading step. See U.S. Patent Application Pub. No. 2015/0275727.

The activated carbons used in current state-of-the-art evaporative emission control canisters are generally obtained from natural sources such as coal or agricultural byproducts, and typically have a surface area in the 1100-2200 $m^2/g$ range and a total pore volume in the 0.8-1.5 $cm^3/g$ range. Notably, when the pore volume is plotted as a function of pore radius, these activated carbons all have a peak just below 20 Ångstroms (Å), with relatively little pore volume in the 30-80 Å range.

Stricter regulations on DBL emissions continue to prompt development of improved evaporative emission control systems, particularly for use in vehicles with reduced purge volumes (i.e., hybrid vehicles). Such vehicles may otherwise produce high DBL emissions due to lower purge frequency, which equates to lower total purge volume and higher residual hydrocarbon heel. Accordingly, it is desirable to have an evaporative emission control system with low DBL emissions despite low volume and/or infrequent purge cycles. Further, despite previously disclosed devices for capturing evaporative hydrocarbon emissions from the fuel system, there remains a need for evaporative emission control systems with high efficiency to reduce space requirements and weight while further reducing the quantity of potential evaporative emissions under a variety of conditions. Particularly desirable are evaporative emission control articles and systems with a lower heel-build.

SUMMARY OF THE INVENTION

A coated substrate adapted for hydrocarbon adsorption and an evaporative emission control articles and systems comprising the coated substrate are provided. The disclosed coated substrates, articles and systems are useful in controlling evaporative hydrocarbon emissions and may provide low diurnal breathing loss (DBL) emissions even under a low purge condition. The coated substrates remove evaporative emissions generated in an internal combustion engine and/or associated fuel source components before the emissions can be released into the atmosphere. The coated substrates comprise activated carbons with novel pore-size distributions, providing a higher absorption capacity at low hydrocarbon concentrations while maintaining low heel build over many adsorption/desorption cycles, like state-of-the-art activated carbons. It has been surprisingly found that only a certain combination of surface area, pore volume distribution, and butane isotherm shape can qualify the coated carbon to meet the stringent emission regulations. Accordingly, in a first aspect is provided a coated substrate adapted for hydrocarbon adsorption, the coated substrate having at least one surface, and a coating on the at least one surface, the coating comprising particulate carbon and a binder, wherein the particulate carbon has a BET surface area of at least about 1300 $m^2/g$, and at least one of: (i) a butane affinity of greater than 60% at 5% butane; (ii) a butane affinity of greater than 35% at 0.5% butane; (iii) a micropore volume greater than about 0.2 ml/g and a mesopore volume greater than about 0.5 ml/g.

In some embodiments, the particulate carbon has an n-butane adsorption capacity of at least about 40 ml/g at about 3 mm Hg n-butane pressure. In some embodiments, the particulate carbon has an n-butane adsorption capacity of from about 40 ml/g to about 80 ml/g at about 3 mm Hg n-butane pressure. In some embodiments, the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

In some embodiments, the particulate carbon has a BET surface area of from about 1300 $m^2/g$ to about 2500 $m^2/g$. In some embodiments, the particulate carbon has a BET surface area of from about 1400 $m^2/g$ to about 1600 $m^2/g$.

In some embodiments, the particulate carbon has a micropore volume is from about 0.20 ml/g to about 0.35 ml/g. In some embodiments, the particulate carbon has a micropore volume is from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

In some embodiments, the particulate carbon has a mesopore volume of from about 0.5 ml/g to about 0.8 ml/g. In some embodiments, the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g. In certain specific embodiments, the particulate carbon has a BET surface area of about 1400 $m^2/gram$, a micropore volume of about 0.3 ml/g, and a mesopore volume of about 0.75 ml/g.

In some embodiments, the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof. In some embodiments, the substrate is a monolith. In some embodiments, the monolith is a ceramic. In some embodiments, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane. In some embodiments, the substrate is a non-woven fabric. In some embodiments, the substrate is an extruded media. In some embodiments, the extruded media is a honeycomb. In other embodiments, the substrate is a foam. In some embodiments, the foam has greater than about 10 pores per inch. In some embodiments, the foam has greater than about 20 pores per inch. In some embodiments, the foam has between about 15 and about 40 pores per inch. In some embodiments, the foam is a polyurethane. In some embodiments, the polyurethane is a polyether or polyester. In some embodiments, the foam is a reticulated polyurethane.

In some embodiments, the coating thickness is less than about 500 microns.

In some embodiments, the binder is present in an amount from about 10% to about 50% by weight relative to the particulate carbon. In some embodiments, the binder is an organic polymer. In some embodiments, the binder is an acrylic/styrene copolymer latex.

In another aspect is provided a bleed emission scrubber, the scrubber comprising an adsorbent volume comprising a coated substrate adapted for hydrocarbon adsorption, the coated substrate comprising a substrate having at least one surface, and a coating on the at least one surface, the coating comprising particulate carbon and a binder, wherein the particulate carbon has a BET surface area of at least about 1300 m$^2$/gram; and at least one of: (i) a butane affinity of greater than 60% at 5% butane; (ii) a butane affinity of greater than 35% at 0.5% butane; (iii) a micropore volume greater than about 0.2 ml/g and a mesopore volume greater than about 0.5 ml/g.

In some embodiments, the particulate carbon has an n-butane adsorption capacity of at least about 40 ml/g at about 3 mm Hg n-butane pressure. In some embodiments, the particulate carbon has an n-butane adsorption capacity of from about 40 ml/g to about 80 ml/g at about 3 mm Hg n-butane pressure. In some embodiments, the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

In some embodiments, the particulate carbon has a BET surface area of from about 1300 m$^2$/g to about 2100 m$^2$/g. In some embodiments, the particulate carbon has a BET surface area of from about 1400 m$^2$/g to about 1600 m$^2$/g. In some embodiments, the particulate carbon has a micropore volume is from about 0.20 ml/g to about 0.35 ml/g.

In some embodiments, the particulate carbon has a micropore volume is from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

In some embodiments, the particulate carbon has a mesopore volume of from about 0.5 ml/g to about 0.8 ml/g. In some embodiments, the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g. In certain specific embodiments, the particulate carbon has a BET surface area of about 1400 m$^2$/g, a micropore volume of about 0.3 ml/g, and a mesopore volume of about 0.75 ml/g.

In some embodiments, the adsorbent volume has a g-total butane working capacity (BWC) of less than about 2 grams. In some embodiments, the adsorbent volume has a g-total BWC of from about 0.2 grams to about 1.6 grams.

In some embodiments, the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof. In some embodiments, the substrate is a monolith. In some embodiments, the monolith is a ceramic. In some embodiments, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

In some embodiments, the coating thickness is less than about 500 microns.

In some embodiments, the binder is present in an amount from about 10% to about 50% by weight relative to the particulate carbon. In some embodiments, the binder is an organic polymer. In some embodiments, the binder is an acrylic/styrene copolymer latex.

In a further aspect is provided an evaporative emission control canister system comprising a first adsorbent volume contained within a first canister, a fuel vapor purge tube for connecting the first canister to an engine, a fuel vapor inlet conduit for venting the fuel tank to the first canister, and a vent conduit for venting the first canister to the atmosphere and for admission of purge air to the first canister; and a second adsorbent volume comprising the bleed emission scrubber as disclosed herein; wherein the second adsorbent volume is in fluid communication with the first adsorbent volume, the bleed emission scrubber being contained within the first canister or contained within a second canister; and wherein the evaporative emission control canister system is configured to permit sequential contact of the first adsorbent volume and the second adsorbent volume by the fuel vapor.

In some embodiments, the particulate carbon has an n-butane adsorption capacity of at least about 40 ml/g at about 3 mm Hg n-butane pressure. In some embodiments, the particulate carbon has an n-butane adsorption capacity of from about 40 ml/g to about 80 ml/g at about 3 mm Hg n-butane pressure. In some embodiments, the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

In some embodiments, the particulate carbon has a BET surface area of from about 1300 m$^2$/g to about 2500 m$^2$/g. In some embodiments, the particulate carbon has a BET surface area of from about 1400 m$^2$/g to about 1600 m$^2$/g.

In some embodiments, the particulate carbon has a micropore volume is from about 0.20 ml/g to about 0.35 ml/g. In some embodiments, the particulate carbon has a micropore volume is from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

In some embodiments, the particulate carbon has a mesopore volume of from about 0.5 ml/g to about 0.8 ml/g. In some embodiments, the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g. In certain specific embodiments, the particulate carbon has a BET surface area of about 1400 m$^2$/gram, a micropore volume of about 0.3 ml/g, and a mesopore volume of about 0.7 ml/g.

In some embodiments, the bleed emission scrubber is contained in the first canister.

In some embodiments, the bleed emission scrubber is contained in the second canister.

In some embodiments, the second adsorbent volume has an effective butane working capacity (BWC) of less than about 3 g/dL, and a g-total BWC of less than about 2 grams. In some embodiments, the second adsorbent volume has a g-total BWC of from about 0.2 grams to about 1.999 grams. In some embodiments, the second adsorbent volume further comprises a third adsorbent volume, the third adsorbent volume having a g-total BWC of at least about 0.05 grams.

In some embodiments, the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof. In some embodiments, the substrate is a monolith. In some embodiments, the monolith is a ceramic. In some embodiments, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

In some embodiments, the coating thickness is less than about 500 microns.

In some embodiments, the binder is present in an amount from about 10% to about 50% by weight relative to the particulate carbon. In some embodiments, the binder is an organic polymer. In some embodiments, the binder is an acrylic/styrene copolymer latex.

In some embodiments, the third adsorbent volume comprises a reticulated polyurethane foam.

In some embodiments, the evaporative emission control canister system has a first adsorbent volume of from about 1.9 to about 3.0 liters and exhibits a 2-Day Diurnal Breathing Loss (DBL) that is less than about 20 mg under the California Bleed Emission Test Protocol (BETP) when tested under the following test conditions: i. the first adsorbent volume is 2.5 L, and at a purge volume of 80 bed volumes; or ii. the first adsorbent volume is 1.9 L, and at a purge volume of 135 bed volumes.

In some embodiments, the second absorbent volume has a g-total BWC of less than about 2 grams, while the evaporative emission control canister maintains a 2-day DBL that is less than about 20 mg under the California BETP.

In a still further aspect is provided an evaporative emission control system as disclosed herein, the system further comprising a fuel tank for fuel storage; and an internal combustion engine adapted to consume the fuel; wherein the evaporative emission control system is defined by a fuel vapor flow path from the fuel vapor inlet conduit to the first canister, toward the second adsorbent volume and to the vent conduit, and by a reciprocal air flow path from the vent conduit to the second adsorbent volume, toward the first canister, and toward the fuel vapor purge tube.

In some embodiments, the particulate carbon has an n-butane adsorption capacity of at least about 40 ml/g at about 3 mm Hg n-butane pressure. In some embodiments, the particulate carbon has an n-butane adsorption capacity of from about 40 ml/g to about 80 ml/g at about 3 mm Hg n-butane pressure. In some embodiments, the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

In some embodiments, the particulate carbon has a BET surface area of from about 1300 $m^2/g$ to about 2100 $m^2/g$. In some embodiments, the particulate carbon has a BET surface area of from about 1400 $m^2/g$ to about 1600 $m^2/g$.

In some embodiments, the particulate carbon has a micropore volume is from about 0.20 ml/g to about 0.35 ml/g. In some embodiments, the particulate carbon has a micropore volume is from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

In some embodiments, the particulate carbon has a mesopore volume of from about 0.5 ml/g to about 0.8 ml/g. In some embodiments, the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g. In certain specific embodiments, the particulate carbon has a BET surface area of about 1400 $m^2/gram$, a micropore volume of about 0.3 ml/g, and a mesopore volume of about 0.7 ml/g.

In some embodiments, the bleed emission scrubber is contained in the first canister. In some embodiments, the bleed emission scrubber is contained in the second canister.

In some embodiments, the second adsorbent volume has an effective butane working capacity (BWC) of less than about 3 g/dL, and a g-total BWC of less than about 2 grams. In some embodiments, the second adsorbent volume has a g-total BWC of from about 0.2 grams to about 1.999 grams. In some embodiments, the second adsorbent volume further comprises a third adsorbent volume, the third adsorbent volume having a g-total BWC of at least about 0.05 grams.

In some embodiments, the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof. In some embodiments, the substrate is a monolith. In some embodiments, the monolith is a ceramic. In some embodiments, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

In some embodiments, the coating thickness is less than about 500 microns.

In some embodiments, the binder is present in an amount from about 10% to about 50% by weight relative to the particulate carbon. In some embodiments, the binder is an organic polymer. In some embodiments, the binder is an acrylic/styrene copolymer latex.

In some embodiments, the third adsorbent volume comprises a reticulated polyurethane foam.

In some embodiments, the first adsorbent volume is from about 1.9 to about 3.0 liters, and the 2-Day Diurnal Breathing Loss (DBL) is less than about 20 mg under the California Bleed Emission Test Protocol (BETP) when tested under the following test conditions: i. the first adsorbent volume is 2.5 L, and at a purge volume of 80 bed volumes; or ii. the first adsorbent volume is 1.9 L, and at a purge volume of 135 bed volumes.

In a still further aspect is provided an evaporative emission control canister system comprising an evaporative emission control canister comprising at least one canister adsorbent volume comprising a canister adsorbent material, and at least one bleed emission scrubber; wherein the at least one bleed emission scrubber comprises a scrubber adsorbent volume, wherein the scrubber adsorbent volume comprises a scrubber adsorbent material and has a g-total BWC of less than about 2 grams; wherein the bleed emission scrubber is in fluid communication with the evaporative emission control canister; wherein the evaporative emission control canister is configured to permit sequential contact of the canister adsorbent volume and the scrubber adsorbent volume by the fuel vapor; and wherein the evaporative emission control canister system has a 2-Day Diurnal Breathing Loss (DBL) of less than about 20 mg under the California Bleed Emission Test Protocol (BETP) when tested under the following test conditions: i. the first adsorbent volume is 2.5 L, and at a purge volume of 80 bed volumes; or ii. the first adsorbent volume is 1.9 L, and at a purge volume of 135 bed volumes.

In some embodiments, the evaporative emission control canister system further comprises a fuel vapor purge tube for connecting the evaporative emission control canister system to an engine, a fuel vapor inlet conduit for venting the fuel tank to the evaporative emission control canister, and a vent conduit for venting the evaporative emission control canister to the atmosphere and for admission of purge air to the evaporative emission control canister.

In some embodiments, the canister adsorbent material is selected from the group consisting of activated carbon, carbon charcoal, zeolites, clays, porous polymers, porous alumina, porous silica, molecular sieves, kaolin, titania, ceria, and combinations thereof. In some embodiments, the activated carbon is derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof.

In some embodiments, the scrubber adsorbent material comprises a particulate carbon, wherein the particulate carbon has a BET surface area of at least about 1300 $m^2/g$; and at least one of: (i) a butane affinity of greater than 60% at 5% butane; (ii) a butane affinity of greater than 35% at 0.5% butane; (iii) a micropore volume greater than about 0.2 ml/g and a mesopore volume greater than about 0.5 ml/g.

In some embodiments, the particulate carbon has an n-butane adsorption capacity of at least about 40 ml/g at about 3 mm Hg n-butane pressure. In some embodiments, the particulate carbon has an n-butane adsorption capacity of from about 40 ml/g to about 80 ml/g at about 3 mm Hg n-butane pressure.

In some embodiments, the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

In some embodiments, the particulate carbon has a BET surface area of from about 1300 $m^2/g$ to about 2500 $m^2/g$. In some embodiments, the particulate carbon has a BET surface area of from about 1400 $m^2/g$ to about 1600 $m^2/g$.

In some embodiments, the particulate carbon has a micropore volume of from about 0.20 ml/g to about 0.35 ml/g. In some embodiments, the particulate carbon has a micropore volume of from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

In some embodiments, the particulate carbon has a mesopore volume of from about 0.5 ml/g to about 0.8 ml/g. In some embodiments, the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g.

In some embodiments, the particulate carbon has a BET surface area of about 1400 $m^2/gram$, a micropore volume of about 0.3 ml/g, and a mesopore volume of about 0.75 ml/g.

In some embodiments, the bleed emissions scrubber comprises a substrate. In some embodiments, the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof. In some embodiments, the substrate is molded, formed or extruded with a mixture comprising the scrubber adsorbent material. In some embodiments, the substrate comprises a coating, wherein the coating comprises the scrubber adsorbent material and a binder. In some embodiments, the substrate is a monolith. In some embodiments, the monolith is a ceramic. In some embodiments, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

In some embodiments, the coating thickness is less than about 500 microns.

In some embodiments, the binder is present in an amount from about 10% to about 50% by weight relative to the particulate carbon. In some embodiments, the binder is an organic polymer. In some embodiments, the binder is an acrylic/styrene copolymer latex.

In some embodiments, the second adsorbent volume has an effective BWC of less than about 2 grams/dl. In some embodiments, the second adsorbent volume has an effective BWC of from about 0.5 grams/dl to about 2 grams/dl. In some embodiments, the second adsorbent volume has an effective BWC of from about 0.5, about 0.6, about 0.7, about 0.8, or about 0.9 to about 1.0, about 1.1, about 1.2, about 1.3, about 1.4, about 1.5, about 1.6, about 1.7, about 1.8, about 1.9, or about 2.0 grams/dL. In some embodiments, the second adsorbent volume has a g-total BWC from about 0.1 grams to less than about 2 grams. In some embodiments, the second adsorbent volume has a g-total BWC of from about 0.1, about 0.2, about 0.3, about 0.4, about 0.5, about 0.6, about 0.7, about 0.8, or about 0.9, to about 1.0, about 1.1, about 1.2, about 1.3, about 1.4, about 1.5, about 1.6, about 1.7, about 1.8, or about 1.9 grams.

In some embodiments, the evaporative emission control canister has a canister adsorbent volume of 3.5 L or less, 3.0 L or less, 2.5 L or less, or 2.0 L or less.

In some embodiments, the evaporative emission control canister system comprises a single canister adsorbent volume, wherein the canister adsorbent volume comprises at least one chamber, wherein there is canister adsorbent material loaded within the at least one chamber; a single bleed emission scrubber, wherein the at least one bleed emission scrubber comprises a scrubber adsorbent volume, wherein the scrubber adsorbent volume comprises a scrubber adsorbent material and has a g-total BWC of less than about 2 grams; a canister adsorbent volume of from about 1.5 L to about 2.0 L; wherein the evaporative emission control canister has a 2-Day Diurnal Breathing Loss (DBL) of less than about 20 mg under the California Bleed Emission Test Protocol (BETP) at a purge volume of 135 bed volumes.

In some embodiments, the evaporative emission control canister system has a 2-Day DBL of less than about 10 mg under the BETP.

In some embodiments, the evaporative emission control canister system comprises a single canister adsorbent volume, wherein the canister adsorbent volume comprises at least one chamber, wherein there is canister adsorbent material loaded within the at least one chamber; a single bleed emission scrubber; and a canister adsorbent volume of from about 2.5 L to about 3.0 L; the evaporative emission control canister system having a 2-Day Diurnal Breathing Loss (DBL) of less than about 20 mg under the California Bleed Emission Test Protocol (BETP) at a purge volume of 80 bed volumes. In some embodiments, the evaporative emission control canister has a 2-Day DBL of less than about 10 mg under the BETP at a purge volume of 80 bed volumes.

In some embodiments, the canister adsorbent volume comprises two chambers, wherein there is canister adsorbent material loaded within each chamber. In some embodiments, the second adsorbent volume has an effective BWC of less than about 2 grams/dl. In some embodiments, the second adsorbent volume has an effective BWC of from about 0.5 grams/dl to about 2 grams/dl. In some embodiments, the second adsorbent volume has an effective BWC of from about 0.5, about 0.6, about 0.7, about 0.8, or about 0.9 to about 1.0, about 1.1, about 1.2, about 1.3, about 1.4, about 1.5, about 1.6, about 1.7, about 1.8, about 1.9, or about 2.0 grams/dL. In some embodiments, the second adsorbent volume has a g-total BWC from about 0.1 grams to less than about 2 grams. In some embodiments, the second adsorbent volume has a g-total BWC of from about 0.1, about 0.2, about 0.3, about 0.4, about 0.5, about 0.6, about 0.7, about 0.8, or about 0.9, to about 1.0, about 1.1, about 1.2, about 1.3, about 1.4, about 1.5, about 1.6, about 1.7, about 1.8, or about 1.9 grams.

The present disclosure includes, without limitation, the following embodiments.

Embodiment 1. A coated substrate adapted for hydrocarbon adsorption comprising a substrate having at least one surface, and a coating on the at least one surface, the coating comprising particulate carbon and a binder, wherein the particulate carbon has a BET surface area of at least about 1300 $m^2/g$; and at least one of: (i) a butane affinity of greater than 60% at 5% butane; (ii) a butane affinity of greater than 35% at 0.5% butane; (iii) a micropore volume greater than about 0.2 ml/g and a mesopore volume greater than about 0.5 ml/g.

Embodiment 2. The coated substrate of the preceding embodiment, wherein the particulate carbon has an n-butane adsorption capacity of at least about 40 ml/g at about 3 mm Hg n-butane pressure.

Embodiment 3. The coated substrate of any preceding embodiment, wherein the particulate carbon has an n-butane adsorption capacity of from about 40 ml/g to about 80 ml/g at about 3 mm Hg n-butane pressure.

Embodiment 4. The coated substrate of any preceding embodiment, wherein the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

Embodiment 5. The coated substrate of any preceding embodiment, wherein the particulate carbon has a BET surface area of from about 1300 $m^2/g$ to about 2100 $m^2/g$.

Embodiment 6. The coated substrate of any preceding embodiment, wherein the particulate carbon has a BET surface area of from about 1400 $m^2/g$ to about 1600 $m^2/g$.

Embodiment 7. The coated substrate of any preceding embodiment, wherein the particulate carbon has a micropore volume is from about 0.20 ml/g to about 0.35 ml/g.

Embodiment 8. The coated substrate of any preceding embodiment, wherein the particulate carbon has a micropore volume is from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

Embodiment 9. The coated substrate of any preceding embodiment, wherein the particulate carbon has a mesopore volume of from about 0.5 ml/g to about 0.8 ml/g.

Embodiment 10. The coated substrate of any preceding embodiment, wherein the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g.

Embodiment 11. The coated substrate of any preceding embodiment, wherein the particulate carbon has a BET surface area of about 1400 $m^2/g$, a micropore volume of about 0.3 ml/g, and a mesopore volume of about 0.75 ml/g.

Embodiment 12. The coated substrate of any preceding embodiment, wherein the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof.

Embodiment 13. The coated substrate of any preceding embodiment, wherein the substrate is a monolith.

Embodiment 14. The coated substrate of any preceding embodiment, wherein the monolith is a ceramic.

Embodiment 15. The coated substrate of any preceding embodiment, wherein the substrate is a plastic.

Embodiment 16. The coated substrate of any preceding embodiment, wherein the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

Embodiment 17. The coated substrate of any preceding embodiment, wherein the coating thickness is less than about 500 microns.

Embodiment 18. The coated substrate of any preceding embodiment, wherein the binder is present in an amount from about 10% to about 50% by weight relative to the particulate carbon.

Embodiment 19. The coated substrate of any preceding embodiment, wherein the binder is an organic polymer.

Embodiment 20. The coated substrate of any preceding embodiment, wherein the binder is an acrylic/styrene copolymer latex.

Embodiment 21. A bleed emission scrubber, the scrubber comprising an adsorbent volume comprising a coated substrate adapted for hydrocarbon adsorption, the coated substrate comprising at least one surface, and a coating on the at least one surface, the coating comprising particulate carbon and a binder, wherein the particulate carbon has a BET surface area of at least about 1300 $m^2/g$; and at least one of: (i) a butane affinity of greater than 60% at 5% butane; (ii) a butane affinity of greater than 35% at 0.5% butane; (iii) a micropore volume greater than about 0.2 ml/g and a mesopore volume greater than about 0.5 ml/g.

Embodiment 22. The bleed emission scrubber of any preceding embodiment, wherein the particulate carbon has an n-butane adsorption capacity of at least about 40 ml/g at about 3 mm Hg n-butane pressure.

Embodiment 23. The bleed emission scrubber of any preceding embodiment, wherein the particulate carbon has an n-butane adsorption capacity of from about 40 ml/g to about 80 ml/g at about 3 mm Hg n-butane pressure.

Embodiment 24. The bleed emission scrubber of any preceding embodiment, wherein the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

Embodiment 25. The bleed emission scrubber of any preceding embodiment, wherein the particulate carbon has a BET surface area of from about 1300 $m^2/g$ to about 2100 $m^2/g$.

Embodiment 26. The bleed emission scrubber of any preceding embodiment, wherein the particulate carbon has a BET surface area of from about 1400 $m^2/g$ to about 1600 $m^2/g$.

Embodiment 27. The bleed emission scrubber of any preceding embodiment, wherein the particulate carbon has a micropore volume is from about 0.20 ml/g to about 0.35 ml/g.

Embodiment 28. The bleed emission scrubber of any preceding embodiment, wherein the particulate carbon has a micropore volume is from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

Embodiment 29. The bleed emission scrubber of any preceding embodiment, wherein the particulate carbon has a mesopore volume of from about 0.5 ml/g to about 0.8 ml/g.

Embodiment 30. The bleed emission scrubber of any preceding embodiment, wherein the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g.

Embodiment 31. The bleed emission scrubber of any preceding embodiment, wherein the particulate carbon has a BET surface area of about 1400 $m^2/g$, a micropore volume of about 0.3 ml/g, and a mesopore volume of about 0.75 ml/g.

Embodiment 32. The bleed emission scrubber of any preceding embodiment, wherein the adsorbent volume has a g-total butane working capacity (BWC) of less than about 2 grams.

Embodiment 33. The bleed emission scrubber of any preceding embodiment, wherein the adsorbent volume has a g-total BWC of from about 0.2 grams to about 1.6 grams.

Embodiment 34. The bleed emission scrubber of any preceding embodiment, wherein the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof.

Embodiment 35. The bleed emission scrubber of any preceding embodiment, wherein the substrate is a monolith.

Embodiment 36. The bleed emission scrubber of any preceding embodiment, wherein the monolith is a ceramic.

Embodiment 37. The bleed emission scrubber of any preceding embodiment, wherein the substrate is a plastic.

Embodiment 38. The bleed emission scrubber of any preceding embodiment, wherein the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

Embodiment 39. The bleed emission scrubber of any preceding embodiment, wherein the coating thickness is less than about 500 microns.

Embodiment 40. The bleed emission scrubber of any preceding embodiment, wherein the binder is present in an amount from about 10% to about 50% by weight relative to the particulate carbon.

Embodiment 41. The bleed emission scrubber of any preceding embodiment, wherein the binder is an organic polymer.

Embodiment 42. The bleed emission scrubber of any preceding embodiment, wherein the binder is an acrylic/styrene copolymer latex.

Embodiment 43. An evaporative emission control canister system comprising a first adsorbent volume contained within a first canister, a fuel vapor purge tube for connecting the first canister to an engine, a fuel vapor inlet conduit for venting the fuel tank to the first canister, and a vent conduit for venting the first canister to the atmosphere and for admission of purge air to the first canister; and a second adsorbent volume comprising the bleed emission scrubber of any previous embodiment; wherein the second adsorbent volume is in fluid communication with the first adsorbent volume, the bleed emission scrubber being contained within the first canister or contained within a second canister; and wherein the evaporative emission control system is configured to permit sequential contact of the first adsorbent volume and the second adsorbent volume by the fuel vapor.

Embodiment 44. The evaporative emission control canister system of any preceding embodiment, wherein the particulate carbon has an n-butane adsorption capacity of at least about 40 ml/g at about 3 mm Hg n-butane pressure.

Embodiment 45. The evaporative emission control canister system of any preceding embodiment, wherein the particulate carbon has an n-butane adsorption capacity of from about 40 ml/g to about 80 ml/g at about 3 mm Hg n-butane pressure.

Embodiment 46. The evaporative emission control canister system of any preceding embodiment, wherein the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

Embodiment 47. The evaporative emission control canister system of any preceding embodiment, wherein the particulate carbon has a BET surface area of from about 1300 $m^2/g$ to about 2100 $m^2/g$.

Embodiment 48. The evaporative emission control system of any preceding embodiment, wherein the particulate carbon has a BET surface area of from about 1400 $m^2/g$ to about 1600 $m^2/g$.

Embodiment 49. The evaporative emission control canister system of any preceding embodiment, wherein the particulate carbon has a micropore volume is from about 0.20 ml/g to about 0.35 ml/g.

Embodiment 50. The evaporative emission control canister system of any preceding embodiment, wherein the particulate carbon has a micropore volume is from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

Embodiment 51. The evaporative emission control canister system of any preceding embodiment, wherein the particulate carbon has a mesopore volume of from about 0.5 ml/g to about 0.8 ml/g.

Embodiment 52. The evaporative emission control canister system of any preceding embodiment, wherein the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g.

Embodiment 53. The evaporative emission control canister system of any preceding embodiment, wherein the particulate carbon has a BET surface area of about 1400 $m^2$/gram, a micropore volume of about 0.3 ml/g, and a mesopore volume of about 0.7 ml/g.

Embodiment 54. The evaporative emission control canister system of any preceding embodiment, wherein the bleed emission scrubber is located within the first adsorbent volume of the evaporative emission control canister.

Embodiment 55. The evaporative emission control canister system of any preceding embodiment, wherein the bleed emission scrubber is located in a separate canister that is in fluid communication with the evaporative emission control canister.

Embodiment 56. The evaporative emission control canister system of any preceding embodiment, wherein the second adsorbent volume has an effective butane working capacity (BWC) of less than about 3 g/dL, and a g-total BWC of less than about 2 grams.

Embodiment 57. The evaporative emission control canister system of any preceding embodiment, wherein the second adsorbent volume has a g-total BWC of from about 0.2 grams to about 1.999 grams.

Embodiment 58. The evaporative emission control system of any preceding embodiment, wherein the second adsorbent volume further comprises a third adsorbent volume, the third adsorbent volume having a BWC of at least about 0.05 grams.

Embodiment 59. The evaporative emission control canister system of any preceding embodiment, wherein the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof.

Embodiment 60. The evaporative emission control canister system of any preceding embodiment, wherein the substrate is a monolith.

Embodiment 61. The evaporative emission control canister system of any preceding embodiment, wherein the monolith is a ceramic.

Embodiment 62. The evaporative emission control canister system of any preceding embodiment, wherein the substrate is a plastic.

Embodiment 63. The evaporative emission control canister system of any preceding embodiment, wherein the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

Embodiment 64. The evaporative emission control canister system of any preceding embodiment, wherein the coating thickness is less than about 500 microns.

Embodiment 65. The evaporative emission control canister system of any preceding embodiment, wherein the binder is present in an amount from about 10% to about 50% by weight relative to the particulate carbon.

Embodiment 66. The evaporative emission control canister system of any preceding embodiment, wherein the binder is an organic polymer.

Embodiment 67. The evaporative emission control canister system of any preceding embodiment, wherein the binder is an acrylic/styrene copolymer latex.

Embodiment 68. The evaporative emission control canister system of any preceding embodiment, wherein the third adsorbent volume comprises a reticulated polyurethane foam.

Embodiment 69. The evaporative emission control canister system of any preceding embodiment, wherein the first adsorbent volume is from about 1.9 to about 3.0 liters, and wherein the 2-Day Diurnal Breathing Loss (DBL) is less than about 20 mg under the California Bleed Emission Test Protocol (BETP) when tested under the following test conditions: i. the first adsorbent volume is 2.5 L, and at a purge volume of 80 bed volumes; or ii. the first adsorbent volume is 1.9 L, and at a purge volume of 135 bed volumes.

Embodiment 70. The evaporative emission control canister system of any previous embodiment, the system further comprising: a fuel tank for fuel storage; and an internal combustion engine adapted to consume the fuel; wherein the evaporative emission control system is defined by a fuel vapor flow path from the fuel vapor inlet conduit to the first canister, toward the second adsorbent volume and to the vent conduit, and by a reciprocal air flow path from the vent conduit to the second adsorbent volume, toward the first canister, and toward the fuel vapor purge tube.

Embodiment 71. The evaporative emission control canister system of any preceding embodiment, wherein the particulate carbon has an n-butane adsorption capacity of at least about 40 ml/g at about 3 mm Hg n-butane pressure.

Embodiment 72. The evaporative emission control canister system of any preceding embodiment, wherein the particulate carbon has an n-butane adsorption capacity of from about 40 ml/g to about 80 ml/g at about 3 mm Hg n-butane pressure.

Embodiment 73. The evaporative emission control canister system of any preceding embodiment, wherein the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

Embodiment 74. The evaporative emission control canister system of any preceding embodiment, wherein the particulate carbon has a BET surface area of from about 1300 $m^2$/g to about 2100 $m^2$/g.

Embodiment 75. The evaporative emission control canister system of any preceding embodiment, wherein the particulate carbon has a BET surface area of from about 1400 $m^2$/g to about 1600 $m^2$/g.

Embodiment 76. The evaporative emission control canister system of any preceding embodiment, wherein the particulate carbon has a micropore volume is from about 0.20 ml/g to about 0.35 ml/g.

Embodiment 77. The evaporative emission control canister system of any preceding embodiment, wherein the particulate carbon has a micropore volume is from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

Embodiment 78. The evaporative emission control canister system of any preceding embodiment, wherein the particulate carbon has a mesopore volume of from about 0.5 ml/g to about 0.8 ml/g.

Embodiment 79. The evaporative emission control canister system of any preceding embodiment, wherein the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g.

Embodiment 80. The evaporative emission control canister system of any preceding embodiment, wherein the particulate carbon has a BET surface area of about 1400 $m^2$/gram, a micropore volume of about 0.3 ml/g, and a mesopore volume of about 0.7 ml/g.

Embodiment 81. The evaporative emission control canister system of any preceding embodiment, wherein the bleed emission scrubber is contained in the first canister.

Embodiment 82. The evaporative emission control canister system of any preceding embodiment, wherein the bleed emission scrubber is contained in the second canister.

Embodiment 83. The evaporative emission control canister system of any preceding embodiment, wherein the second adsorbent volume has an effective butane working capacity (BWC) of less than about 3 g/dL, and a g-total BWC of less than about 2 grams.

Embodiment 84. The evaporative emission control canister system of any preceding embodiment, wherein the second adsorbent volume has a g-total BWC of from about 0.2 grams to about 1.999 grams.

Embodiment 85. The evaporative emission control canister system of any preceding embodiment, wherein the second adsorbent volume further comprises a third adsorbent volume, the third adsorbent volume having a g-total BWC of at least about 0.05 grams.

Embodiment 86. The evaporative emission control canister system of any preceding embodiment, wherein the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof.

Embodiment 87. The evaporative emission control canister system of any preceding embodiment, wherein the substrate is a monolith.

Embodiment 88. The evaporative emission control canister system of any preceding embodiment, wherein the monolith is a ceramic.

Embodiment 89. The evaporative emission control canister system of any preceding embodiment, wherein the substrate is a plastic.

Embodiment 90. The evaporative emission control canister system of any preceding embodiment, wherein the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

Embodiment 91. The evaporative emission control canister system of any preceding embodiment, wherein the coating thickness is less than about 500 microns.

Embodiment 92. The evaporative emission control canister system of any preceding embodiment, wherein the binder is present in an amount from about 10% to about 50% by weight relative to the particulate carbon.

Embodiment 93. The evaporative emission control canister system of any preceding embodiment, wherein the binder is an organic polymer.

Embodiment 94. The evaporative emission control canister system of any preceding embodiment, wherein the binder is an acrylic/styrene copolymer latex.

Embodiment 95. The evaporative emission control canister system of any preceding embodiment, wherein the third adsorbent volume comprises a reticulated polyurethane foam.

Embodiment 96. The evaporative emission control canister system of any preceding embodiment, wherein the first adsorbent volume is from about 1.9 to about 3.0 liters, and wherein the 2-Day Diurnal Breathing Loss (DBL) is less than about 20 mg under the California Bleed Emission Test Protocol (BETP) when tested under the following test conditions: i. the first adsorbent volume is 2.5 L, and at a purge volume of 80 bed volumes; or ii. the first adsorbent volume is 1.9 L, and at a purge volume of 135 bed volumes.

Embodiment 97. The evaporative emission control canister system of any preceding embodiment, wherein the 2-Day DBL is less than about 20 mg under the California BETP, and wherein the second absorbent volume has a g-total BWC of less than about 2 grams.

Embodiment 98. An evaporative emission control canister system comprising an evaporative emission control canister comprising at least one canister adsorbent volume comprising a canister adsorbent material, and at least one bleed emission scrubber; wherein the at least one bleed emission scrubber comprises a scrubber adsorbent volume, wherein the scrubber adsorbent volume comprises a scrubber adsorbent material and has a g-total BWC of less than about 2 grams; wherein the bleed emission scrubber is in fluid communication with the evaporative emission control canister; wherein the evaporative emission control canister is configured to permit sequential contact of the canister adsorbent volume and the scrubber adsorbent volume by the fuel vapor; and wherein the evaporative emission control canister system has a 2-Day Diurnal Breathing Loss (DBL) of less than about 20 mg under the California Bleed Emission Test Protocol (BETP) when tested under the following test conditions: a total canister adsorbent material volume in the evaporative emission control canister of 2.5 L and a purge volume of 80 bed volumes.

Embodiment 99. The evaporative emission control canister system of the previous embodiment, further comprising a fuel vapor purge tube for connecting the evaporative emission control canister to an engine, a fuel vapor inlet conduit for venting the fuel tank to the evaporative emission control canister, and a vent conduit for venting the evaporative emission control canister to the atmosphere and for admission of purge air to the evaporative emission control canister.

Embodiment 100. The evaporative emission control canister system of any previous embodiment, wherein the canister adsorbent material is selected from the group consisting of activated carbon, carbon charcoal, zeolites, clays, porous polymers, porous alumina, porous silica, molecular sieves, kaolin, titania, ceria, and combinations thereof.

Embodiment 101. The evaporative emission control canister system of any previous embodiment, wherein the activated carbon is derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof.

Embodiment 102. The evaporative emission control canister system of any previous embodiment, wherein the scrubber adsorbent material comprises a particulate carbon, wherein the particulate carbon has a BET surface area of at least about 1300 m$^2$/g; and at least one of: (i) a butane affinity of greater than 60% at 5% butane; (ii) a butane affinity of greater than 35% at 0.5% butane; (iii) a micropore volume greater than about 0.2 ml/g and a mesopore volume greater than about 0.5 ml/g.

Embodiment 103. The evaporative emission control canister system of any previous embodiment, wherein the particulate carbon has an n-butane adsorption capacity of at least about 40 ml/g at about 3 mm Hg n-butane pressure.

Embodiment 104. The evaporative emission control canister system of any previous embodiment, wherein the particulate carbon has an n-butane adsorption capacity of from about 40 ml/g to about 80 ml/g at about 3 mm Hg n-butane pressure.

Embodiment 105. The evaporative emission control canister system of any previous embodiment, wherein the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

Embodiment 106. The evaporative emission control canister system of any previous embodiment, wherein the particulate carbon has a BET surface area of from about 1300 m$^2$/g to about 2500 m$^2$/g.

Embodiment 107. The evaporative emission control canister system of any previous embodiment, wherein the particulate carbon has a BET surface area of from about 1400 m$^2$/g to about 1600 m$^2$/g.

Embodiment 108. The evaporative emission control canister system of any previous embodiment, wherein the particulate carbon has a micropore volume of from about 0.20 ml/g to about 0.35 ml/g.

Embodiment 109. The evaporative emission control canister system of any previous embodiment, wherein the particulate carbon has a micropore volume of from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

Embodiment 110. The evaporative emission control canister system of any previous embodiment, wherein the particulate carbon has a mesopore volume of from about 0.5 ml/g to about 0.8 ml/g.

Embodiment 111. The evaporative emission control canister system of any previous embodiment, wherein the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g.

Embodiment 112. The evaporative emission control canister system of any previous embodiment, wherein the particulate carbon has a BET surface area of about 1400 m$^2$/gram, a micropore volume of about 0.3 ml/g, and a mesopore volume of about 0.75 ml/g.

Embodiment 113. The evaporative emission control canister system of any previous embodiment, wherein the bleed emissions scrubber comprises a substrate.

Embodiment 114. The evaporative emission control canister system of any previous embodiment, wherein the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof.

Embodiment 115. The evaporative emission control canister system of any previous embodiment, wherein the substrate is molded, formed or extruded with a mixture comprising the scrubber adsorbent material.

Embodiment 116. The evaporative emission control canister system of any previous embodiment, wherein the substrate comprises a coating, wherein the coating comprises the scrubber adsorbent material and a binder.

Embodiment 117. The evaporative emission control canister system of any previous embodiment, wherein the substrate is a monolith.

Embodiment 118. The evaporative emission control canister system of any previous embodiment, wherein the monolith is a ceramic.

Embodiment 119. The evaporative emission control canister system of any previous embodiment, wherein the substrate is a plastic.

Embodiment 120. The evaporative emission control canister system of any previous embodiment, wherein the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

Embodiment 121. The evaporative emission control canister system of any previous embodiment, wherein the coating thickness is less than about 500 microns.

Embodiment 122. The evaporative emission control canister system of any previous embodiment, wherein the binder is present in an amount from about 10% to about 50% by weight relative to the particulate carbon.

Embodiment 123. The evaporative emission control canister system of any previous embodiment, wherein the binder is an organic polymer.

Embodiment 124. The evaporative emission control canister system of any previous embodiment, wherein the binder is an acrylic/styrene copolymer latex.

Embodiment 125. The evaporative emission control canister system of any previous embodiment, wherein the second adsorbent volume has an effective BWC of less than about 2 grams/dl.

Embodiment 126. The evaporative emission control canister system of any previous embodiment, wherein the second adsorbent volume has an effective BWC of from about 0.5 grams/dl to about 2 grams/dl.

Embodiment 127. The evaporative emission control canister system of any previous embodiment, wherein the second adsorbent volume has a g-total BWC from about 0.1 grams to less than about 2 grams.

Embodiment 128. The evaporative emission control canister system of any previous embodiment, wherein the evaporative emission control canister has a canister adsorbent volume of 3.5 L or less, 3.0 L or less, 2.5 L or less, or 2.0 L or less.

Embodiment 129. The evaporative emission control canister system of any previous embodiment, comprising a single canister adsorbent volume, wherein the canister adsorbent volume comprises at least one chamber, wherein there is canister adsorbent material loaded within the at least one chamber; a single bleed emission scrubber, wherein the at least one bleed emission scrubber comprises a scrubber adsorbent volume, wherein the scrubber adsorbent volume comprises a scrubber adsorbent material and has a g-total BWC of less than about 2 grams; a canister adsorbent volume of from about 1.5 L to about 2.0 L; wherein the evaporative emission control canister has a 2-Day Diurnal Breathing Loss (DBL) of less than about 20 mg under the California Bleed Emission Test Protocol (BETP) at a purge volume of 135 bed volumes.

Embodiment 130. The evaporative emission control canister system of any previous embodiment, wherein the wherein the evaporative emission control canister has a 2-Day Diurnal Breathing Loss (DBL) of less than about 10 mg under the California Bleed Emission Test Protocol (BETP) at a purge volume of 135 bed volumes.

Embodiment 131. The evaporative emission control canister system of any previous embodiment, wherein the canister adsorbent volume comprises two chambers, wherein there is canister adsorbent material loaded within each chamber.

Embodiment 132. The evaporative emission control canister system of any previous embodiment, wherein the second adsorbent volume has an effective BWC of less than about 2 grams/dl.

Embodiment 133. The evaporative emission control canister system of any previous embodiment, wherein the second adsorbent volume has an effective BWC of from about 0.5 grams/dl to about 2 grams/dl.

Embodiment 134. The evaporative emission control canister system of any previous embodiment, wherein the second adsorbent volume has a g-total BWC from about 0.1 grams to less than about 2 grams.

Embodiment 135. The evaporative emission control canister system of any previous embodiment, comprising a single canister adsorbent volume, wherein the canister adsorbent volume comprises at least one chamber, wherein there is canister adsorbent material loaded within the at least one chamber; a single bleed emission scrubber; a canister adsorbent volume of from about 2.5 L to about 3.0 L; wherein the evaporative emission control canister has a 2-Day Diurnal Breathing Loss (DBL) of less than about 20 mg under the California Bleed Emission Test Protocol (BETP) at a purge volume of 80 bed volumes.

Embodiment 136. The evaporative emission control canister system of any previous embodiment, wherein the evaporative emission control canister has a 2-Day Diurnal Breathing Loss (DBL) of less than about 10 mg under the California Bleed Emission Test Protocol (BETP) at a purge volume of 80 bed volumes.

Embodiment 137. The evaporative emission control canister system of any previous embodiment, wherein the canister adsorbent volume comprises two chambers, wherein there is canister adsorbent material loaded within each chamber.

Embodiment 138. The evaporative emission control canister system of any previous embodiment, wherein the second adsorbent volume has an effective BWC of less than about 2 grams/dl.

Embodiment 139. The evaporative emission control canister system of any previous embodiment, wherein the second adsorbent volume has an effective BWC of from about 0.5 grams/dl to about 2 grams/dl.

Embodiment 140. The evaporative emission control canister system of any previous embodiment, wherein the second adsorbent volume has a g-total BWC from about 0.1 grams to less than about 2 grams.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 5 is a graph illustrating the cumulative pore volume measurements at pore widths of 1-30 Å for several particulate carbons;

FIG. 6D is a graph illustrating butane adsorption for several particulate carbons;

DETAILED DESCRIPTION OF THE INVENTION

Figure 1A:
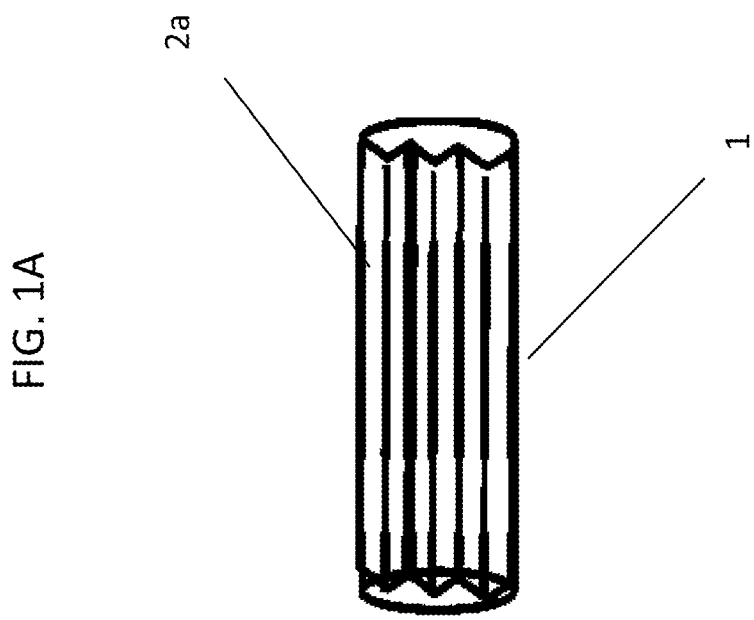
FIG. 1A is a cross-sectional of a bleed emission scrubber provided according to a first embodiment.

The present disclosure is aimed at a coated substrate adapted for hydrocarbon adsorption and an evaporative emission control articles and systems comprising the coated substrate are provided. The disclosed coated substrates, articles and systems are useful in controlling evaporative hydrocarbon emissions and may provide low diurnal breathing loss (DBL) emissions even under a low purge condition. The coated substrates remove evaporative emissions generated in an internal combustion engine and/or associated fuel source components before the emissions can be released into the atmosphere. The coated substrates comprise activated carbons with novel pore-size distributions, providing a higher adsorption capacity at relevant fugitive emission concentrations, and low heel build over many adsorption/desorption cycles, as compared to state-of-the-art activated carbons. It has been surprisingly found that only a certain combination of surface area, pore volume distribution, and butane isotherm shape can qualify the coated carbon to meet the stringent emission regulations.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

Unless otherwise defined, all technical terms used herein have the same meaning as commonly understood by one of ordinary skill in the art to which this disclosure belongs.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

The term "adsorbent material," as used herein, refers to an adsorbent material or adsorbent containing material along vapor flow path, and may consist of a bed of particulate material, a monolith, honeycomb, sheet or other material.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

The term "micropore volume" refers to the volume of pores within the particulate carbon which have pore sizes of from about 0.3 nm to about 1 nm.

The term "mesopore volume" refers to the volume of pores within the particulate carbon which have pore sizes of from about 1 nm to about 30 nm.

As used herein, the term "substrate" refers to the material onto which the adsorbent material is placed, typically in the form of a washcoat.

As used herein, the term "washcoat" has its usual meaning in the art of a thin, adherent coating of a material applied to a substrate material. A washcoat is formed by preparing a slurry containing a specified solids content (e.g., 10-50% by weight) of adsorbent in a liquid, which is then coated onto a substrate and dried to provide a washcoat layer.

The term "vehicle" means for instance any vehicle having an internal combustion engine and includes for instance passenger automobiles, sport utility vehicles, minivans, vans, trucks, buses, refuse vehicles, freight trucks, construction vehicles, heavy equipment, military vehicles, farm vehicles and the like.

Unless otherwise indicated, all parts and percentages are by weight. "Weight percent (wt %)," if not otherwise indicated, is based on an entire composition free of any volatiles, that is, based on dry solids content.

Coating Compositions

The present coatings comprise particulate carbon and a binder. Particulate carbon is an activated carbon; activated carbon is a highly porous carbon with a very large surface area, generally at least about 400 m$^2$/g. Activated carbon is well known in the art. See, e.g., commonly-assigned U.S. Pat. No. 7,442,232. See also U.S. Pat. No. 7,467,620.

Described herein is an activated particulate carbon material having unique adsorption properties. When the pore volume of this particulate carbon is plotted as a function of pore radius, in addition to a peak just below 20 Å (2 nm), the present particulate carbon has a significant amount of pore volume in the 30-80 Å (3-8 nm) range. Without wishing to be bound by theory, it is believed that this feature of additional pore volume in the 30-80 Å range imparts a lower heel build compared to state-of-the-art activated carbons used for evaporative emission control of hydrocarbons in automotive applications. This particulate carbon is made from a synthetic resin precursor by a process which can produce activated carbons with pore-size distributions that are not achievable with other methods and precursors. Such particulate carbon is available as P2-15 from EnerG2 Technologies, Inc. (100 NE Northlake Way, Seattle, WA 98105, USA; a subsidiary of BASF).

In some embodiments, the particulate carbon has a micropore volume from about 0.20 ml/g to about 0.35 ml/g at pore sizes of from about 0.3 nm to about 1 nm. In some embodiments, the particulate carbon has a micropore volume from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

In some embodiments, the particulate carbon has a mesopore volume of from about 0.5 ml/g to about 0.8 ml/g at pore sizes of from about 1 nm to about 30 nm. In some embodiments, the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g.

In certain embodiments, the particulate carbon has a micropore volume greater than about 0.2 ml/g, and a mesopore volume greater than about 0.5 ml/g. In certain specific embodiments, the particulate carbon has a micropore volume of about 0.3 ml/g and a mesopore volume of about 0.75 ml/g. In certain specific embodiments, the particulate carbon has a BET surface area of about 1400 m$^2$/g, a micropore volume of about 0.3 ml/g, and a mesopore volume of about 0.75 ml/g.

In some embodiments, the particulate carbon has a BET surface area of at least about 1300 m$^2$/g. In some embodiments, the particulate carbon has a BET surface area of from about 1300 m$^2$/g to about 2100 m$^2$/g. In some embodiments, the particulate carbon has a BET surface area of from about 1400 m$^2$/g to about 1600 m$^2$/g. As used herein, the term "BET surface area" has its usual meaning of referring to the Brunauer, Emmett, Teller method for determining surface area by N₂ adsorption. Pore diameter and pore volume can also be determined using BET-type N₂ adsorption or desorption experiments.

In some embodiments, the particulate carbon has an n-butane adsorption capacity of at least about 40 ml/g at about 3 mm Hg n-butane pressure. In some embodiments, the particulate carbon has an n-butane adsorption capacity of from about 40 ml/g to about 80 ml/g at about 3 mm Hg n-butane pressure. In some embodiments, the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

In some embodiments, the particulate carbon may be defined by its Butane Affinity. The "Butane Affinity" of a material can be calculated by collecting a butane isotherm measurement as described herein. The butane isotherm measurement provides a curve plotting the amount of butane adsorbed vs. the absolute pressure of butane in units of mm Hg. The Butane Affinity can then be calculated by setting the absolute partial pressure of butane at 760 mg Hg (i.e., atmospheric pressure) equal to a "Butane Percentage" of 100% and then plotting the adsorbed amount of butane vs. butane percentage. The data curve may be normalized by plotting the amount of butane adsorbed as a fraction of the amount of butane adsorbed at a Butane Percentage of 50%. The Butane Affinity at 0.5% butane and at 5% butane may then be determined from this plot by reading the fraction of butane adsorbed at 50% at these butane concentrations. In other words, the Butane Affinity of the material at 5% and 0.5% is the percentage of the butane that the material adsorbs at butane partial pressures of 38 mm Hg and 3.8 mm Hg, respectfully, compared to the amount of butane that the material adsorbs at 380 mm Hg butane pressure as determined by the butane isotherm measurement.

In some embodiments, the particulate carbon has a Butane Affinity of greater than 60% at 5% butane, for example, from about 60% to about 100%, from about 60% to about 99%, from about 65% to about 95%, from about 70% to about 90%, or from about 75% to about 85% at 5% butane. In some embodiments, the particulate carbon has a Butane Affinity of from about 75% to about 80% at 5% butane. In some embodiments, the particulate carbon has a Butane Affinity of greater than 35% at 0.5% butane, for example, from about 35% to about 100%, from about 35% to about 99%, from about 40% to about 75%, from about 45% to about 60%, or from about 45% to about 50% at 0.5% butane. In some embodiments, the particulate carbon has a Butane Affinity of greater than 60% at 5% butane and a Butane Affinity of greater than 35% at 0.5% butane.

In some embodiments, the particulate carbon has a BET surface area of at least about 1300 m²/g and a Butane Affinity of greater than 60% at 5% butane. In some embodiments, the particulate carbon has a BET surface area of at least about 1300 m²/g and a Butane Affinity of greater than 35% at 0.5% butane. In some embodiments, the particulate carbon has a BET surface area of at least about 1300 m²/g, a Butane Affinity of greater than 60% at 5% butane, and a Butane Affinity of greater than 35% at 0.5% butane In some embodiments, the particulate carbon has a BET surface area of at least about 1300 m²/g; a Butane Affinity of greater than 60% at 5% butane, a Butane Affinity of greater than 35% at 0.5% butane, or both; and a micropore volume greater than about 0.2 ml/g, a mesopore volume greater than about 0.5 ml/g, or both. In some embodiments, the particulate carbon has a BET surface area of at least about 1300 m²/g; a Butane Affinity of greater than 60% at 5% butane; a Butane Affinity of greater than 35% at 0.5% butane; a micropore volume greater than about 0.2 ml/g; and a mesopore volume greater than about 0.5 ml/g. Accordingly, any possible combination of these features is contemplated, provided that at least one of said features is present.

The hydrocarbon adsorbent coating further comprises an organic binder that will cause the adsorbent coating to adhere to the substrate. Upon application of the coating as a slurry and drying, the binder material fixes the hydrocarbon adsorbent particles to themselves and the substrate. In some cases, the binder can crosslink with itself to provide improved adhesion. This enhances the integrity of the coating, its adhesion to the substrate, and provides structural stability under vibrational conditions encountered in motor vehicles. The binder may also comprise additives to improve water resistance and improve adhesion. Binders typical for use in the formulation of slurries include, but are not restricted to, the following: organic polymers; sols of alumina, silica or zirconia; inorganic salts, organic salts and/or hydrolysis products of aluminum, silica or zirconium; hydroxides of aluminum, silica or zirconium; organic silicates that are hydrolyzable to silica; and mixtures thereof. The preferred binder is an organic polymer. The organic polymer may be a thermosetting or thermoplastic polymer and may be plastic or elastomeric. The binder may be, for example, an acrylic/styrene copolymer latex, a styrene-butadiene copolymer latex, a polyurethane, or any mixture thereof. The polymeric binder may contain suitable stabilizers and age resistors known in the polymeric art. In some embodiments, the binder is a thermosetting, elastomeric polymer introduced as a latex into the adsorbent composition, optionally as an aqueous slurry. Preferred are thermosetting, elastomeric polymers introduced as a latex into the adsorbent composition, preferably as an aqueous slurry.

Useful organic polymer binder compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, polyvinyl alcohol, thermoplastic polyesters, thermosetting polyesters, poly (phenylene oxide), poly(phenylene sulfide), fluorinated polymers such as poly(tetrafluoroethylene), polyvinylidene fluoride, poly(vinylfluoride) and chloro/fluoro copolymers such as ethylene chlorotrifluoro-ethylene copolymer, polyamide, phenolic resins and epoxy resins, polyurethane, acrylic/styrene acrylic copolymer latex and silicone polymers. In some embodiment, the polymeric binder is an acrylic/styrene acrylic copolymer latex, such as a hydrophobic styrene-acrylic emulsion. In some embodiments, the binder is selected from the group consisting of an acrylic/styrene copolymer latex, a styrene-butadiene copolymer latex, a polyurethane, and mixtures thereof.

Considerations regarding the compatibility of the components of a slurry comprising a hydrocarbon adsorbent material and a polymeric binder, such as a latex emulsion, are known in the art. See, for instance, commonly-assigned U.S. Publication No. 2007/0107701. In some embodiments, the organic binder can have a low glass transition temperature (Tg). Tg is conventionally measured by differential scanning calorimetry (DSC) by methods known in the art. An exemplary hydrophobic styrene-acrylic emulsion binder having a low Tg is Rhoplex™ P-376 (Trademark of Dow Chemical; available from Rohm and Haas. Independence Mall West, Philadelphia, Pa., 19105). In some embodiments, the binder has a Tg less than about 0° C. An exemplary binder having a Tg less than about 0° C. is Rhoplex™ NW-1715K (Trademark of Dow Chemical; also available from Rohm and Haas). In some embodiments, the binder is an alkyl phenol ethoxylate (APEO)-free, ultra-low formaldehyde, styrenated acrylic emulsion. One such exemplary binder is Joncryl™ 2570. In some embodiments, the binder is an aliphatic polyurethane dispersion. One such exemplary binder is Joncryl™ FLX 5200. Joncryl™ is a Trademark of BASF; Joncryl™ products are available from BASF; Wyandotte, MI, 48192. In some embodiments, the binder is present in an amount from about 10% to about 50% by weight relative to the particulate carbon.

The hydrocarbon adsorbent coatings of the present invention, particularly those slurries containing polymer latexes, can contain conventional additives such as thickeners, dispersants, surfactants, biocides, antioxidants and the like. A thickener makes it possible to achieve a sufficient amount of coating (and hence sufficient hydrocarbon adsorption capacity) on relatively low surface area substrates. The thickener may also serve in a secondary role by increasing slurry stability by steric hindrance of the dispersed particles. It may also aid in the binding of the coating surface. Exemplary thickeners are a xanthan gum thickener or a carboxymethyl-cellulose thickener. Kelzan® CC, a product of CP Kelco (Cumberland Center II, 3100 Cumberland Boulevard, Suite 600, Atlanta GA, 30339), is one such exemplary xanthan thickener.

In some embodiments, it is preferred to use a dispersant in conjunction with the binder. The dispersant may be anionic, non-ionic or cationic and is typically utilized in an amount of about 0.1 to about 10 weight percent, based on the weight of the material. Not surprisingly, the specific choice of dispersant is important. Suitable dispersants may include polyacrylates, alkoxylates, carboxylates, phosphate esters, sulfonates, taurates, sulfosuccinates, stearates, laureates, amines, amides, imidazolines, sodium dodecylbenzene sulfonate, sodium dioctyl sulfosuccinate, and mixtures thereof. In one embodiment, the dispersant is a low molecular weight polyacrylic acid in which many of the protons on the acid are replaced with sodium. In some embodiments, the dispersant is a polycarboxylate ammonium salt. In some embodiments, the dispersant is a hydrophobic copolymer pigment dispersant. An exemplary dispersant is Tamol™ 165A (Trademark of Dow Chemical; available from Rohm & Haas). While increasing the slurry pH or adding anionic dispersant alone may provide enough stabilization for the slurry mixture, best results may be obtained when both an increased pH and anionic dispersant are used. In some embodiments, the dispersant is a non-ionic surfactant such as Surfynol® 420 (Air Products and Chemicals, Inc). In some embodiments, the dispersant is an acrylic block copolymer such as Dispex® Ultra PX 4575 (BASF).

In some embodiments, it is preferred to use a surfactant, which can act as a defoamer. In some embodiments, the surfactant is a low molecular non-anionic dispersant. An exemplary oil-free and silicone-free defoamer surfactant is Rhodoline® 999 (Solvay). Another exemplary surfactant is a blend of hydrocarbons and non-ionic surfactants, such as Foammaster® NXZ (BASF).

In some embodiments the binder is present in an amount from about 10% to about 50% by weight relative to the particulate carbon. In some embodiments, the binder is an organic polymer. In some embodiments, the binder is an acrylic/styrene copolymer latex.

Substrates

In one or more embodiments, the present coating compositions are disposed on a substrate. Articles comprising the coated substrates, such as a bleed emission scrubber may, in some embodiments, be part of an evaporative emission control systems. Present substrates are 3-dimensional, having a length and a diameter and a volume, similar to a cylinder. The shape does not necessarily have to conform to a cylinder. The length is an axial length defined by an inlet end and an outlet end. The diameter is the largest cross-section length, for example the largest cross-section if the shape does not conform exactly to a cylinder. In one or more embodiments, the substrate is monolith, described herein below.

As used herein, the term "monolithic substrate" is a substrate of the type having fine, parallel gas flow passages extending there through from an inlet or an outlet face of the substrate such that passages are open to fluid flow there through. The passages, which may be essentially straight paths or may be patterned paths (e.g., zig-zag, herringbone, etc.) from their fluid inlet to their fluid outlet, are defined by walls on which the adsorbent material is coated as a wash-coat so that the gases flowing through the passages contact the adsorbent material. The flow passages of the monolithic substrate are thin-walled channels, which can be of any suitable cross-sectional shape and size such as trapezoidal, rectangular, square, triangular, sinusoidal, hexagonal, oval, circular, etc. Such structures may contain from about 60 to about 900 or more gas inlet openings (i.e., cells) per square inch of cross section. Monolithic substrates may be comprised of, for example, metal, ceramic, plastic, paper, impregnated paper, and the like. In some embodiments, the substrate is a carbon monolith.

In one or more embodiments, the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

In one embodiment, the substrate is an extruded media. In some embodiments, the extruded media is a honeycomb. The honeycomb may be in any geometrical shape including, but not limited to, round, cylindrical, or square. Furthermore, the cells of honeycomb substrates may be of any geometry.

In one embodiment, the substrate is a foam. In some embodiments, the foam has greater than about 10 pores per inch. In some embodiments, the foam has greater than about 20 pores per inch. In some embodiments, the foam has between about 15 and about 40 pores per inch. In some embodiments, the foam is a polyurethane. In some embodiments, the foam is a reticulated polyurethane. In some embodiments, the polyurethane is a polyether or polyester. In some embodiments, the substrate is a non-woven.

In some embodiments, the substrate is a plastic. In some embodiments, the substrate is a thermoplastic polyolefin. In some embodiments, the substrate is a thermoplastic polyolefin containing a glass or mineral filler. In some embodiments, the substrate is a plastic selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

In certain alternative embodiments, the particulate carbon may be combined with additional materials and extruded to form an adsorptive porous monolith. Accordingly, such porous monoliths represent adsorbent articles which do not include a substrate and adsorbent coating, and may be utilized in, for example, a bleed emission scrubber as described herein below. To prepare such porous monoliths, generally, the particulate carbon as described herein may be combined with, for example, a ceramic forming material, flux material, binder, and water to make an extrudable mixture. The extrudable mixture may then be extruded through an extrusion die to form a monolith having a honeycomb structure. After extrusion, the extruded honeycomb monolith may be dried and then fired at a temperature and for a time period sufficient to form a monolith having the particulate carbon dispersed throughout the structure. Suitable methods for preparing such extruded porous monoliths are disclosed in, for example, U.S. Pat. No. 5,914,294 to Park et al., the disclosure of which is incorporated by reference herein with respect to such methods.

Articles—Bleed Emission Scrubber

In one aspect of the disclosure is provided a bleed emission scrubber, the scrubber comprising an adsorbent volume comprising a coated substrate as described herein, adapted for hydrocarbon adsorption, the coated substrate comprising at least one surface, and a coating on the at least one surface, the coating comprising particulate carbon as described herein and a binder as described herein, wherein the particulate carbon has a BET surface area of at least about 1300 m$^2$/g; and at least one of: (i) a butane affinity of greater than 60% at 5% butane; (ii) a butane affinity of greater than 35% at 0.5% butane; (iii) a micropore volume greater than about 0.2 ml/g and a mesopore volume greater than about 0.5 ml/g. In some embodiments, the particulate carbon has an n-butane adsorption capacity of at least about 40 ml/g at about 3 mm Hg n-butane pressure. In some embodiments, the particulate carbon has an n-butane adsorption capacity of from about 40 ml/g to about 80 ml/g at about 3 mm Hg n-butane pressure. In some embodiments, the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

In some embodiments, the particulate carbon has a BET surface area of from about 1300 m$^2$/g to about 2500 m$^2$/g. In some embodiments, the particulate carbon has a BET surface area of from about 1400 m$^2$/g to about 1600 m$^2$/g.

In some embodiments, the particulate carbon has a micropore volume is from about 0.20 ml/g to about 0.35 ml/g. In some embodiments, the particulate carbon has a micropore volume is from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

In some embodiments, the particulate carbon has a mesopore volume of from about 0.5 ml/g to about 0.8 ml/g. In some embodiments, the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g.

In some embodiments, the particulate carbon has a BET surface area of about 1400 m$^2$/g, a micropore volume of about 0.3 ml/g, and a mesopore volume of about 0.75 ml/g.

In some embodiments, the adsorbent volume has a g-total butane working capacity (BWC) of less than about 2 grams. As used herein, "g-total BWC" refers to the amount of butane purged under standard test conditions (e.g., ASTM D5228). In some embodiments, the adsorbent volume has a g-total BWC of from about 0.2 grams to about 1.6 grams. for example, from about 0.2 grams, about 0.3 grams, about 0.4 grams, about 0.5 grams, about 0.6 grams, about 0.7 grams, about 0.8 grams, about 0.9 grams, or about 1 gram, to about 1.1 grams, about 1.2 grams, about 1.3 grams, about 1.4 grams, about 1.5 grams, or about 1.6 grams.

In some embodiments, the adsorbent volume has an effective butane working capacity (BWC) of less than 3 g/dL. As used herein, "effective butane working capacity" refers to g-total BWC divided by the effective adsorbent volume. Effective adsorbent volume corrects for voids, air gaps, and other non-adsorptive volumes. Effective BWC determination is disclosed in, for example, U.S. Patent Application Publication No. 2015/0275727, which is incorporated by reference herein.

Figure 1B:
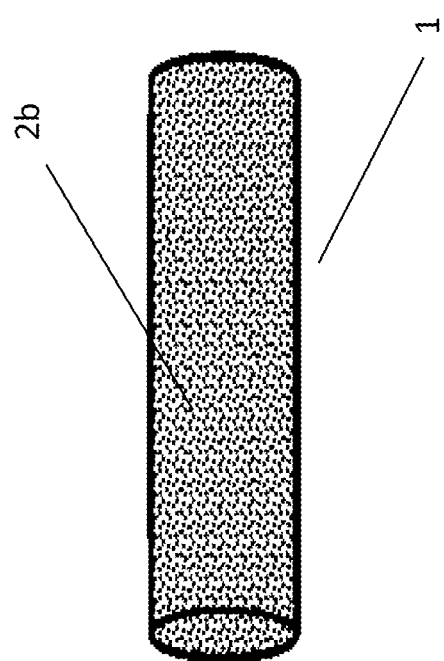
FIG. 1B is a cross-sectional view f a bleed emission scrubber provided according to a second embodiment.

FIG. 1A illustrates an embodiment of bleed emission scrubber 1, wherein the coated substrate is a structured media of pleated form (2a). FIG. 1B illustrates an embodiment wherein the coated substrate is a foam 2b. In one embodiment, the foam 2b has greater than about 10 pores per inch. In some embodiments, the foam 2b has greater than about 20 pores per inch. In some embodiments, the foam 2b has between about 15 and about 40 pores per inch. In one embodiment, the foam 2b is a polyurethane. In some embodiments, the foam 2b is a reticulated polyurethane. In some embodiments, the polyurethane is a polyether or polyester.

Figure 1C:
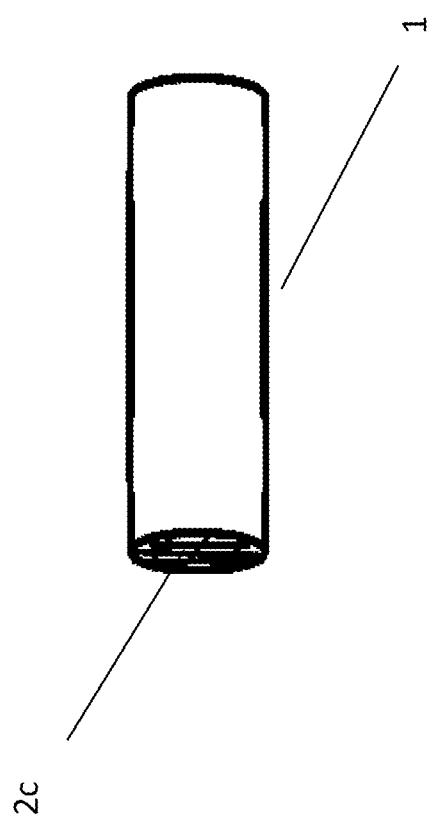
FIG. 1C is a cross-sectional view of a bleed emission scrubber provided according to a third embodiment.

FIG. 1C illustrates an embodiment wherein the coated substrate is an extruded media 2c. In some embodiments, the extruded media 2c is a honeycomb. The honeycomb adsorbent may be in any geometrical shape including, but not limited to, round, cylindrical, or square. Furthermore, the cells of honeycomb adsorbents may be of any geometry. Honeycombs of uniform cross-sectional areas for the flow-through passages, such as square honeycombs with square cross-sectional cells or spiral wound honeycombs of corrugated form, may perform better than round honeycombs with square cross-sectional cells in a right angled matrix that provides adjacent passages with a range of cross-sectional areas and therefore passages that are not equivalently purged. Without being bound by any theory, it is believed that the more uniform cell cross-sectional areas across the honeycomb faces, the more uniform flow distribution within the scrubber during both adsorption and purge cycles, and, therefore, lower diurnal breathing loss (DBL) emissions from the scrubber.

Surprisingly, it has been found that the adsorbent volume of bleed emission scrubbers as disclosed herein, can, in some embodiments, have a butane working capacity (BWC) lower than that of competitive monoliths, yet still effectively control the hydrocarbon emissions from an evaporative emission control canister under low purge conditions.

Particularly, foam substrates as disclosed herein exhibit a lower butane working capacity than competitive monoliths, yet more efficiently control emissions under low purge volumes. Without wishing to be bound by theory, this may be due to the low thickness of the adsorbent coating, and/or the high turbulence of the gas flow though the foam, which may provide more rapid purging than the bulk monolith used in competitive products.

In certain embodiments, the adsorbent volume does not comprise a coated substrate, instead comprising a porous extruded monolith comprising the particulate carbon as described herein.

Evaporative Emission Control Canister and Canister Systems

The coated substrate for hydrocarbon adsorption as disclosed herein can be used as a component in an evaporative emission control canister system. Therefore, in yet another aspect an evaporative emission control canister system comprising an evaporative emission control canister comprising at least one canister adsorbent volume comprising a canister adsorbent material, and at least one bleed emission scrubber as disclosed herein; wherein the at least one bleed emission scrubber comprises a scrubber adsorbent volume, wherein the scrubber adsorbent volume comprises a scrubber adsorbent material and has a g-total BWC of less than about 2 grams; wherein the bleed emission scrubber is in fluid communication with the evaporative emission control canister; wherein the evaporative emission control canister is configured to permit sequential contact of the canister adsorbent volume and the scrubber adsorbent volume by the fuel vapor; and wherein the evaporative emission control canister has a 2-Day Diurnal Breathing Loss (DBL) of less than about 20 mg under the California Bleed Emission Test Protocol (BETP). In some embodiments, the evaporative emission control canister system has a 2-Day Diurnal Breathing Loss (DBL) of less than about 20 mg under the California Bleed Emission Test Protocol (BETP) when tested under the following test conditions: a total canister adsorbent material volume in the evaporative emission control canister of 2.5 L and a purge volume of 80 bed volumes. In some embodiments, the evaporative emission control canister system has a 2-Day Diurnal Breathing Loss (DBL) of less than about 20 mg under the California Bleed Emission Test Protocol (BETP) when tested under the following test conditions: a total canister adsorbent material volume in the evaporative emission control canister of 1.9 L and a purge volume of 135 bed volumes.

In some embodiments, the evaporative emission control canister further comprises a fuel vapor purge tube for connecting the evaporative emission control canister to an engine, a fuel vapor inlet conduit for venting the fuel tank to the evaporative emission control canister, and a vent conduit for venting the evaporative emission control canister to the atmosphere and for admission of purge air to the evaporative emission control canister.

In some embodiments, the canister adsorbent material is selected from the group consisting of activated carbon, carbon charcoal, zeolites, clays, porous polymers, porous alumina, porous silica, molecular sieves, kaolin, titania, ceria, and combinations thereof. In some embodiments, the activated carbon is derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof.

In some embodiments, the scrubber adsorbent material comprises a particulate carbon, wherein the particulate carbon has a BET surface area of at least about 1300 m$^2$/g; and at least one of: (i) a butane affinity of greater than 60% at 5% butane; (ii) a butane affinity of greater than 35% at 0.5% butane; (iii) a micropore volume greater than about 0.2 ml/g and a mesopore volume greater than about 0.5 ml/g.

In some embodiments, the particulate carbon has an n-butane adsorption capacity of at least about 40 ml/g at about 3 mm Hg n-butane pressure. In some embodiments, the particulate carbon has an n-butane adsorption capacity of from about 40 ml/g to about 80 ml/g at about 3 mm Hg n-butane pressure. In some embodiments, the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure.

In some embodiments, the particulate carbon has a BET surface area of from about 1300 m$^2$/g to about 2500 m$^2$/g. In some embodiments, the particulate carbon has a BET surface area of from about 1400 m$^2$/g to about 1600 m$^2$/g.

In some embodiments, the particulate carbon has a micropore volume of from about 0.20 ml/g to about 0.35 ml/g. In some embodiments, the particulate carbon has a micropore volume of from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g.

In some embodiments, the particulate carbon has a mesopore volume of from about 0.5 ml/g to about 0.8 ml/g. In some embodiments, the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g.

In some embodiments, the particulate carbon has a BET surface area of about 1400 m$^2$/gram, a micropore volume of about 0.3 ml/g, and a mesopore volume of about 0.75 ml/g.

In some embodiments, the bleed emissions scrubber comprises a substrate. In some embodiments, the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof. In some embodiments, the substrate is molded, formed or extruded with a mixture comprising the scrubber adsorbent material. In some embodiments, the substrate comprises a coating, wherein the coating comprises the scrubber adsorbent material and a binder. In some embodiments, the substrate is a monolith. In some embodiments, the monolith is a ceramic. In some embodiments, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

In some embodiments, the coating thickness is less than about 500 microns.

In some embodiments, the binder is present in an amount from about 10% to about 50% by weight relative to the particulate carbon. In some embodiments, the binder is an organic polymer. In some embodiments, the binder is an acrylic/styrene copolymer latex.

In some embodiments, the second adsorbent volume has an effective BWC of less than about 2 grams/dl. In some embodiments, the second adsorbent volume has an effective BWC of from about 0.5 grams/dl to about 2 grams/dl. In some embodiments, the second adsorbent volume has an effective BWC of from about 0.5, about 0.6, about 0.7, about 0.8, or about 0.9 to about 1.0, about 1.1, about 1.2, about 1.3, about 1.4, about 1.5, about 1.6, about 1.7, about 1.8, about 1.9, or about 2.0 grams/dL. In some embodiments, the second adsorbent volume has a g-total BWC from about 0.1 grams to less than about 2 grams. In some embodiments, the second adsorbent volume has a g-total BWC of from about 0.1, about 0.2, about 0.3, about 0.4, about 0.5, about 0.6, about 0.7, about 0.8, or about 0.9, to about 1.0, about 1.1, about 1.2, about 1.3, about 1.4, about 1.5, about 1.6, about 1.7, about 1.8, or about 1.9 grams.

In some embodiments, the evaporative emission control canister has a canister adsorbent volume of 3.5 L or less, 3.0 L or less, 2.5 L or less, or 2.0 L or less.

In some embodiments, the evaporative emission control canister system comprises a single canister adsorbent volume, wherein the canister adsorbent volume comprises at least one chamber, wherein there is canister adsorbent material loaded within the at least one chamber; a single bleed emission scrubber, wherein the at least one bleed emission scrubber comprises a scrubber adsorbent volume, wherein the scrubber adsorbent volume comprises a scrubber adsorbent material and has a g-total BWC of less than about 2 grams; a canister adsorbent volume of from about 1.5 L to about 2.0 L; wherein the evaporative emission control canister system has a 2-Day Diurnal Breathing Loss (DBL) of less than about 20 mg under the California Bleed Emission Test Protocol (BETP) at a purge volume of 135 bed volumes. In some embodiments, the evaporative emission control canister has a 2-Day Diurnal Breathing Loss (DBL) of less than about 10 mg under the California Bleed Emission Test Protocol (BETP).

In some embodiments, the canister adsorbent volume comprises two chambers, wherein there is canister adsorbent material loaded within each chamber. In some embodiments, the second adsorbent volume has an effective BWC of less than about 2 grams/dl. In some embodiments, the second adsorbent volume has an effective BWC of from about 0.5 grams/dl to about 2 grams/dl. In some embodiments, the second adsorbent volume has an effective BWC of from about 0.5, about 0.6, about 0.7, about 0.8, or about 0.9 to about 1.0, about 1.1, about 1.2, about 1.3, about 1.4, about 1.5, about 1.6, about 1.7, about 1.8, about 1.9, or about 2.0 grams/dL. In some embodiments, the second adsorbent volume has a g-total BWC from about 0.1 grams to less than about 2 grams. In some embodiments, the second adsorbent volume has a g-total BWC of from about 0.1, about 0.2, about 0.3, about 0.4, about 0.5, about 0.6, about 0.7, about 0.8, or about 0.9, to about 1.0, about 1.1, about 1.2, about 1.3, about 1.4, about 1.5, about 1.6, about 1.7, about 1.8, or about 1.9 grams.

In some embodiments, the evaporative emission control canister comprises a single canister adsorbent volume, wherein the canister adsorbent volume comprises at least one chamber, wherein there is canister adsorbent material loaded within the at least one chamber; a single bleed emission scrubber; a canister volume of from about 2.5 L to about 3.0 L; wherein the evaporative emission control canister has a 2-Day Diurnal Breathing Loss (DBL) of less than about 20 mg under the California Bleed Emission Test Protocol (BETP) at a purge volume of 80 bed volumes. In some embodiments, the evaporative emission control canister has a 2-Day Diurnal Breathing Loss (DBL) of less than about 10 mg under the California Bleed Emission Test Protocol (BETP).

In some embodiments, the canister adsorbent volume comprises two chambers, wherein there is canister adsorbent material loaded within each chamber. In some embodiments, the second adsorbent volume has an effective BWC of less than about 2 grams/dl. In some embodiments, the second adsorbent volume has an effective BWC of from about 0.5 grams/dl to about 2 grams/dl. In some embodiments, the second adsorbent volume has an effective BWC of from about 0.5, about 0.6, about 0.7, about 0.8, or about 0.9 to about 1.0, about 1.1, about 1.2, about 1.3, about 1.4, about 1.5, about 1.6, about 1.7, about 1.8, about 1.9, or about 2.0 grams/dL. In some embodiments, the second adsorbent volume has a g-total BWC from about 0.1 grams to less than about 2 grams. In some embodiments, the second adsorbent volume has a g-total BWC of from about 0.1, about 0.2, about 0.3, about 0.4, about 0.5, about 0.6, about 0.7, about 0.8, or about 0.9, to about 1.0, about 1.1, about 1.2, about 1.3, about 1.4, about 1.5, about 1.6, about 1.7, about 1.8, or about 1.9 grams.

Evaporative Emission Control System

The evaporative emission control canister system as disclosed herein can be used as a component in an evaporative emission control system for fuel storage. Therefore, in yet another aspect is provided an evaporative emission control system, the evaporative emission control system comprising a first adsorbent volume contained within a first canister, a fuel vapor purge tube for connecting the first canister to an engine, a fuel vapor inlet conduit for venting the fuel tank to the first canister, and a vent conduit for venting the first canister to the atmosphere and for admission of purge air to the first canister; and a second adsorbent volume comprising the bleed emission scrubber as disclosed herein; wherein the second adsorbent volume is in fluid communication with the first adsorbent volume, the bleed emission scrubber being contained within the first canister or contained within a second canister; and wherein the evaporative emission control system is configured to permit sequential contact of the first adsorbent volume and the second adsorbent volume by the fuel vapor. In some embodiments, the evaporative emission control system further comprises a fuel tank for fuel storage; and an internal combustion engine adapted to consume the fuel; wherein the evaporative emission control system is defined by a fuel vapor flow path from the fuel vapor inlet conduit to the first canister, toward the second adsorbent volume and to the vent conduit, and by a reciprocal air flow path from the vent conduit to the second adsorbent volume, toward the first canister, and toward the fuel vapor purge tube.

Evaporative emissions from the fuel tank are adsorbed by the evaporative emission control system during engine off times. The fuel vapor that bleeds from the fuel tank is removed by the adsorbents in the canister system so that the amount of fuel vapor released into the atmosphere is reduced. At the time of operating the engine, atmospheric air is introduced into the canister system and bleed emission scrubber as a purge stream, whereby the hydrocarbons, which were previously adsorbed by the hydrocarbon adsorbent, are desorbed and recirculated to the engine for combustion through a purge line.

Figure 2:
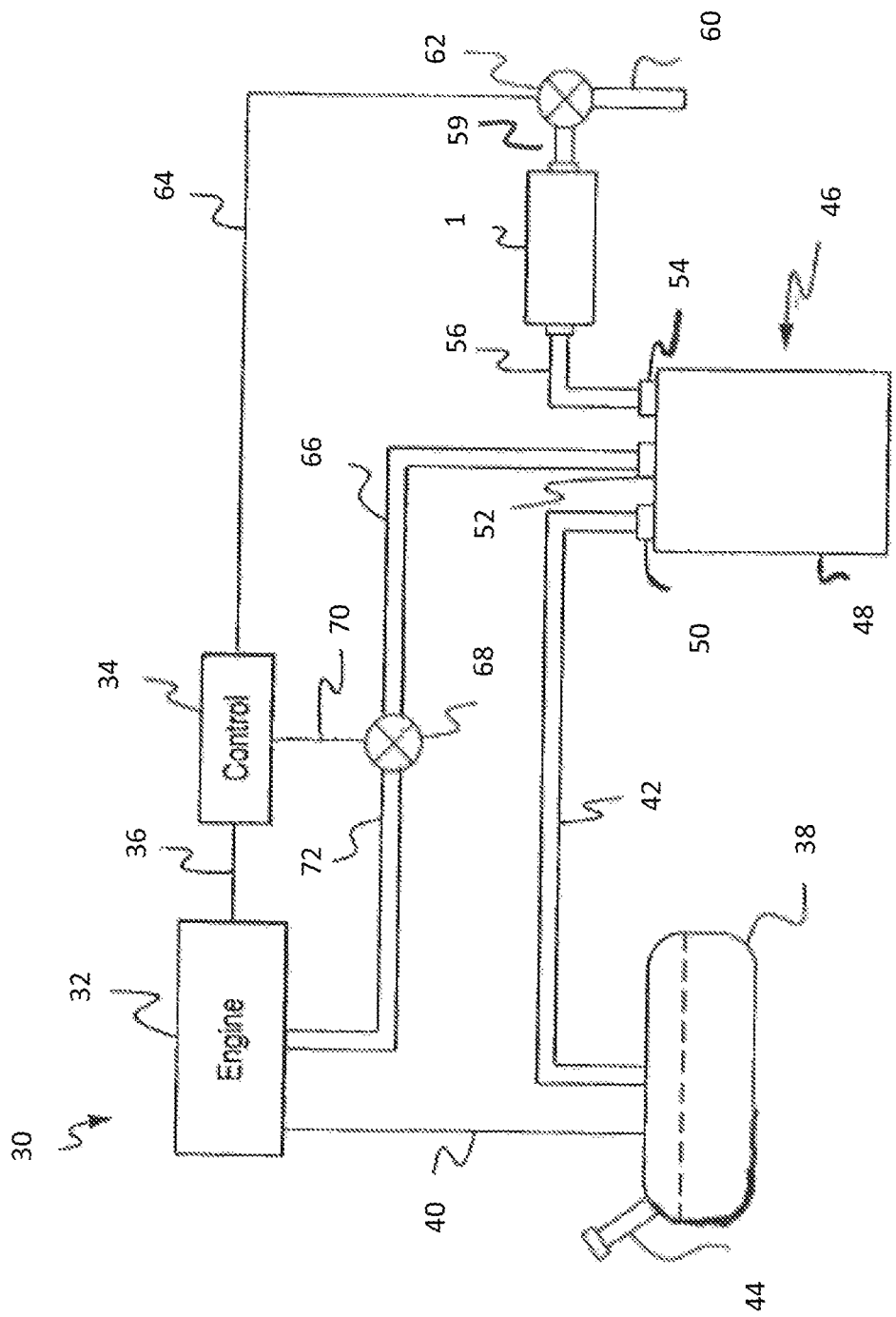
FIG. 2 is a schematic representation of an evaporative emission control system comprising an evaporative emission control canister and a bleed emission scrubber provided in accordance with one embodiment.

The evaporative emission control canister of the evaporative emission control system typically comprises a three-dimensional hollow interior space or chamber defined at least in part by a shaped planar material, such as molded thermoplastic olefin. In some embodiments, the bleed emission scrubber is located within the first adsorbent volume of the evaporative emission control canister. In some embodiments, the bleed emission scrubber is located in a separate canister that is in fluid communication with the evaporative emission control canister. The evaporative emission control system of the present invention according to the embodiment wherein the bleed emission scrubber is located in a separate canister may be more readily appreciated by reference to FIG. 2. FIG. 2 schematically illustrates an evaporative emission control system 30 according to one embodiment of the invention. The evaporative emission control system 30 comprises a fuel tank 38 for fuel storage, an internal combustion engine 32 adapted to consume the fuel, an evaporative emission control canister 46 and a bleed emission scrubber 1. The engine 32 is preferably an internal combustion engine that is controlled by a controller 34. The engine 32 typically burns gasoline, ethanol and other volatile hydrocarbon-based fuels. The controller 34 may be a separate controller or may form part of an engine control module (ECM), a powertrain control module (PCM) or any other vehicle controller.

In accordance with an embodiment of the invention, the evaporative emission control canister 46 comprises a first adsorbent volume (represented by 48), a fuel vapor purge tube 66 connecting the evaporative emission control canister 46 to the engine 32, a fuel vapor inlet conduit 42 for venting the fuel tank 38 to the evaporative emission control canister 46, and vent conduit 56, 59, 60 for venting the evaporative emission control canister 46 to the atmosphere and for admission of purge air to the evaporative emission control canister system.

The evaporative emission control canister system is further defined by a fuel vapor flow path from the fuel vapor inlet conduit 42 to the first adsorbent volume 48, through vent conduit 56 toward the bleed emission scrubber 1 and to the vent conduit 59, 60, and by a reciprocal air flow path from the vent conduit 60, 59 to the bleed emission scrubber 58, through vent conduit 56 toward the first adsorbent volume 48, and toward the fuel vapor purge tube 66. The bleed emission scrubber 1 comprises at least a second adsorbent volume, the second adsorbent volume comprising a coated substrate 2 adapted for hydrocarbon adsorption, as provided and described herein.

Fuel vapor, containing hydrocarbons which have evaporated from the fuel tank 38, can pass from the fuel tank 38 to the first adsorbent volume 48 within canister 46 through evaporative vapor inlet conduit 42. The evaporative emission control canister 46 may be formed from any suitable material. For example, molded thermoplastic polymers such as nylon are typically used.

Fuel vapor pressure increases as the temperature of the gasoline in fuel tank 38 increases. Without the evaporative emission control system 30 of the present invention, the fuel vapor would be released to the atmosphere untreated. However, in accordance with the present invention, fuel vapors are treated by evaporative emission control canister 46 and by the bleed emission scrubber 1, located downstream of the evaporative emission control canister 46.

When the vent valve 62 is open, and purge valve 68 closed, fuel vapors flow under pressure from the fuel tank 38 through the evaporative vapor inlet conduit 42, the canister vapor inlet 50 and sequentially through the first adsorbent volume 48 contained within the evaporative emission control canister 46. Subsequently, any fuel vapors not adsorbed by the first adsorbent volume flow out of the evaporative emission control canister 46 via vent conduit opening 54 and vent conduit 56. The fuel vapors then enter bleed emission scrubber 1 for further adsorption. After passage through the bleed emission scrubber 1, any remaining fuel vapors exit the bleed emission scrubber 1 via conduit 59, vent valve 62, and the vent conduit 60, thereby being released to the atmosphere.

Gradually, the hydrocarbon adsorbent material contained in both the evaporative emission control canister 46 and the second adsorbent volume of bleed emission scrubber 1 become laden with hydrocarbons adsorbed from the fuel vapor. When hydrocarbon adsorbents become saturated with fuel vapor, and thus, hydrocarbons, the hydrocarbons must be desorbed from the hydrocarbon adsorbents for continued control of emitted fuel vapors from the fuel tank 38. During engine operation, engine controller 34 commands valves 62 and 68, via signal leads 64 and 70, respectively, to open, thereby creating an air flow pathway between the atmosphere and the engine 32. The opening of the purge valve 68 allows clean air to be drawn into bleed emission scrubber 1 and subsequently into the evaporative emission control canister 46 via the vent conduit 60, vent conduit 59 and vent conduit 56, from the atmosphere. The clean air, or purge air, flows in through the clean air vent conduit 60, through bleed emission scrubber 1, through vent conduit 56, through the vent conduit opening 54 and into evaporative emission control canister 46. The clean air flows past and/or through the hydrocarbon adsorbents contained within bleed emission scrubber 1 and the emission control canister 46, desorbing hydrocarbons from the saturated hydrocarbon adsorbents within each volume. A stream of purge air and hydrocarbons then exits evaporative emission control canister 46 through purge opening outlet 52, purge line 66 and purge valve 68. The purge air and hydrocarbons flow through purge line 72 to the engine 32, where the hydrocarbons are subsequently combusted.

In some embodiments, the particulate carbon has an n-butane adsorption capacity of at least about 40 ml/g at about 3 mm Hg n-butane pressure. In some embodiments, the particulate carbon has an n-butane adsorption capacity of from about 40 ml/g to about 80 ml/g at about 3 mm Hg n-butane pressure. In some embodiments, the particulate carbon has an n-butane adsorption capacity of from about 40 ml/g, about 45 ml/g, about 50 ml/g, about 55 ml/g, about 60 ml/g, or about 65 ml/g to about 70 ml/g, about 75 ml/g, or about 80 ml/g at about 3 mm Hg n-butane pressure. In some embodiments, the particulate carbon has a BET surface area of from about 1300 $m^2/g$ to about 2500 $m^2/g$. In some embodiments, the particulate carbon has a BET surface area of from about 1400 $m^2/g$ to about 1600 $m^2/g$. In some embodiments, the particulate carbon has a micropore volume of from about 0.20 ml/g to about 0.35 ml/g. In some embodiments, the particulate carbon has a micropore volume of from about 0.20 ml/g, about 0.21 ml/g, about 0.22 ml/g, about 0.23 ml/g, about 0.24 ml/g, or about 0.25 ml/g to about 0.26 ml/g, about 0.27 ml/g, about 0.28 ml/g, about 0.29 ml/g, about 0.30 ml/g, about 0.31 ml/g, about 0.32 ml/g, about 0.33 ml/g, about 0.34 ml/g, or about 0.35 ml/g. In some embodiments, the particulate carbon has a mesopore volume of from about 0.5 ml/g to about 0.8 ml/g. In some embodiments, the particulate carbon has a mesopore volume of from about 0.5 ml/g, about 0.55 ml/g, or about 0.60 ml/g to about 0.65 ml/g, about 0.70 ml/g, about 0.75 ml/g, or about 0.8 ml/g. In some embodiments, the particulate carbon has a BET surface area of about 1400 $m^2$/gram, a micropore volume of about 0.3 ml/g, and a mesopore volume of about 0.7 ml/g. In some embodiments, the particulate carbon has a BET surface area of at least about 1300 $m^2/g$; and at least one of: (i) a butane affinity of greater than 60% at 5% butane; (ii) a butane affinity of greater than 35% at 0.5% butane; (iii) a micropore volume greater than about 0.2 ml/g and a mesopore volume greater than about 0.5 ml/g.

In some embodiments, the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof. In some embodiments, the substrate is a monolith.

In some embodiments, the monolith is a ceramic. In some embodiments, the substrate is a plastic. In some embodiments, the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane. In some embodiments, the coating thickness is less than about 500 microns. In some embodiments, the binder is present in an amount from about 10% to about 50% by weight relative to the particulate carbon. In some embodiments, the binder is an organic polymer. In some embodiments, the binder is an acrylic/styrene copolymer latex.

In some embodiments, the bleed emission scrubber is contained in the first canister. In some embodiments, the bleed emission scrubber is contained in the second canister.

In some embodiments, the second adsorbent volume within bleed emission scrubber 1 has an effective an effective butane working capacity (BWC) of less than about 3 g/dL, and a g-total BWC of less than about 2 grams. In some embodiments, the second adsorbent volume has a g-total BWC of from about 0.2 grams to about 1.999 grams.

Figure 3:
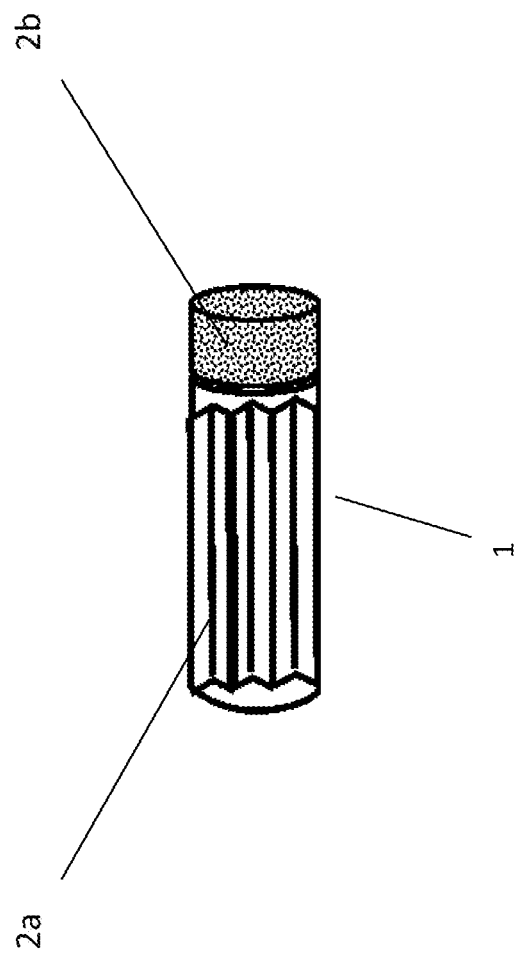
FIG. 3 is a cross-sectional view of a bleed emission scrubber provided according to a fourth embodiment.

In some embodiments, the second adsorbent volume further comprises a third adsorbent volume, the third adsorbent volume having a BWC of at least about 0.05 grams. In some embodiments, the third adsorbent volume comprises a reticulated polyurethane foam. FIG. 3 schematically illustrates a bleed emission scrubber 1 wherein the substrate comprising the second adsorbent volume is an extruded media 2a and the third adsorbent volume comprises a substrate comprising a reticulated polyurethane foam 2b.

The second adsorbent volume (and any additional adsorbent volumes) may include a volumetric diluent. Non-limiting examples of the volumetric diluents may include, but are not limited to, spacers, inert gaps, foams, fibers, springs, or combinations thereof. Additionally, the evaporative emission control canister system may include an empty volume anywhere within the system. As used herein, the term "empty volume" refers to a volume not including any adsorbent. Such volume may comprise any non-adsorbent including, but not limited to, air gap, foam spacer, screen, or combinations thereof.

In some embodiments, the 2-Day Diurnal Breathing Loss (DBL) of the evaporative emission control system is less than about 20 mg under the California Bleed Emission Test Protocol (BETP).

In some embodiments, the first adsorbent volume is from about 1.9 to about 3.0 liters, and the 2-Day Diurnal Breathing Loss (DBL) is less than about 20 mg under the California Bleed Emission Test Protocol (BETP) when tested under the following test conditions: a total canister adsorbent material volume in the evaporative emission control canister of 1.9 L and a purge volume of 135 bed volumes, or a total canister adsorbent material volume in the evaporative emission control canister of 2.5 L and a purge volume of 80 bed volumes.

In some embodiments, the evaporative emission control system maintains a 2-day DBL that is less than about 20 mg under the California BETP, with the second absorbent volume having a g-total BWC of less than about 2 grams.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1: Preparation of Coated Monolith Using Carbon 1

A solution of 1.4% Kelzan CC in water was prepared one day in advance of use. Water (310 ml) was combined with 21 ml of the Kelzan CC thickener solution, 0.65 g of Surfynol 420 dispersant and 0.5 g Foammaster NXZ antifoamer and the combination was mixed thoroughly. To this mixture was added 100 g of a high surface area activated carbon adsorbent (P2-15 from EnerG2 Technologies, Inc; "Carbon 1" of Table 1; inventive embodiment) with stirring. The resulting carbon dispersion was added to a second vessel containing 40 g of Joncryl 2570 binder (50% solution) with stirring. Additional Kelzan CC thickener solution was added until the slurry viscosity was sufficient for coating purposes.

Cylindrical ceramic monolith substrates (230 cells per square inch) of 29×100 mm size (width×length) were dipped into the slurry. Excess slurry was removed by clearing the channels using an air-knife operated at 15 psig pressure. The substrate was dried at 110° C. for 2 hr. The procedure was repeated until the desired carbon loading was achieved.

The g-total BWC of this sample was determined to be 1.29 g, and its effective BWC was determined to be 1.95 g n-butane/dL.

Example 2: Preparation of Coated Monolith Using Carbon 2 (Comparative)

A solution of 1.4% Kelzan CC in water was prepared one day in advance of use. Water (483 ml) was combined with 84.58 g of the Kelzan CC thickener solution, 1.33 g of Surfynol 420 dispersant and 1.03 g Foammaster NXZ antifoamer and the combination was mixed thoroughly. To this mixture was added 205.06 g activated carbon adsorbent ("Carbon 2" of Table 1; comparative) with stirring. The resulting carbon dispersion was added to a second vessel containing 79.93 g of Joncryl 2570 binder (50% solution) with stirring.

Cylindrical ceramic monolith substrates (230 cells per square inch) of 29×100 mm size (width×length) were dipped into the slurry. Excess slurry was removed by clearing the channels using an air-knife operated at 15 psig pressure. The substrate was dried at 110° C. for 2 hr. The procedure was repeated until the desired carbon loading was achieved.

The g-total BWC of this sample was determined to be 1.28 g and its effective BWC was determined to be 1.94 g n-butane/dL.

Example 3: Preparation of Coated Monolith Using Carbon 3 (Comparative)

A solution of 1.4% Kelzan CC in water was prepared one day in advance of use. Water (475 ml) was combined with 31.4 ml of the Kelzan CC thickener solution, 0.98 g of Surfynol 420 dispersant and 0.75 g Foammaster NXZ anti-foamer and the combination was mixed thoroughly. To this mixture was added 50 g activated carbon adsorbent ("Carbon 3" of Table 1; comparative) with stirring. To the carbon dispersion was added 92.6 g of Joncryl FLX5020 binder (50% solution) with stirring. To the slurry was added 4.9 g of a 30% ammonium hydroxide solution to adjust the pH to 8.5. To the slurry was added 100 g of a second activated carbon ("Carbon 1" of Table 1) with stirring.

Water was added as needed until the slurry rheology was sufficient for coating purposes.

Cylindrical ceramic monolith substrates (230 cells per square inch) of 29×100 mm size (width×length) were dipped into the slurry. Excess slurry was removed by clearing the channels using an air-knife operated at 15 psig pressure. The substrate was dried at 110° C. for 2 hr. The procedure was repeated until the desired carbon loading was achieved.

The g-total BWC of this sample was determined to be 1.24 and its effective BWC was determined to be 1.88 g n-butane/dL.

Comparative Example

An Ingevity bleed emission trap of size 29×100 mm and with 230 cells per square inch was tested, in addition to Examples 1-3, in the following tests. The carbon content was determined by LOI up to 1000° C. to be 31.8 wt %. The total weight of the monolith was ~28 g. This carbon content was used to correct the measured surface area, pore volume, and butane absorption capacity in the Examples below. The surface area and pore volume characterization of this comparative carbon are provided in Table 1 (Comparative Example).

The g-total BWC of this sample was determined to be 2.21 g and its effective BWC was determined to be 3.35 g n-butane/L.

Example 4: Measurement of Surface Areas and Pore Size Distributions

Figure 4:
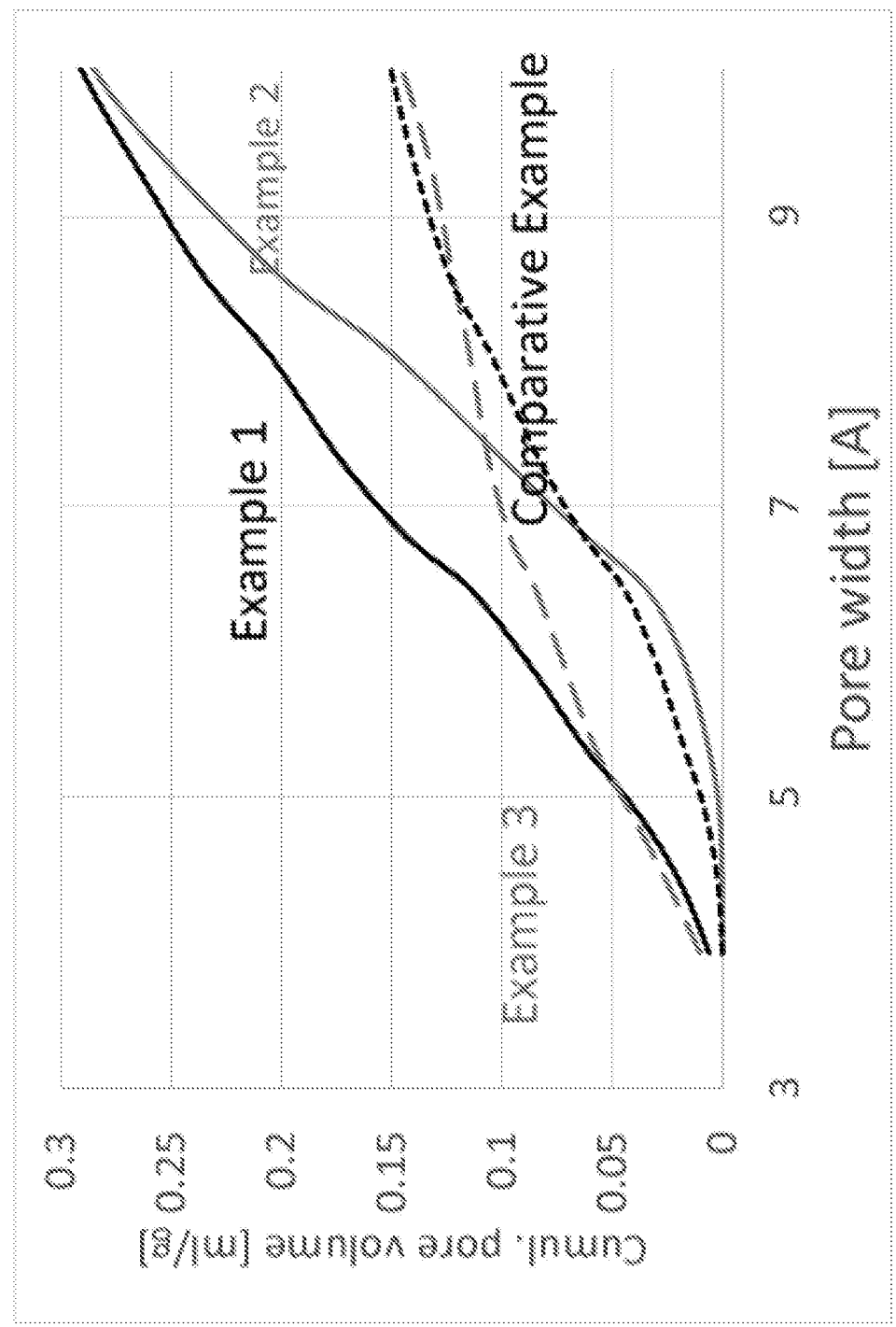
FIG. 4 is a graph illustrating the cumulative pore volume measurements at pore widths of 4-10 Å for several particulate carbons.

Nitrogen pore size distribution and surface area analysis were performed on Micromeritics TriStar 3000 series instruments. The material to be tested was degassed for a total of 6 hours (a 2 hour ramp to 300° C., then a hold at 300° C. for 4 hours, under a flow of dry nitrogen) on a Micromeritics SmartPrep degasser. Nitrogen BET surface area was determined using 5 partial pressure points between 0.08 and 0.20. The Nitrogen pore size was determined using the BJH calculations and 33 desorption points (FIGS. 4 and 5).

TABLE 1

Comparative surface area and pore volume data.

| Absorbent | Surface area [m²/g] | Pore volume [ml/g] radius 1-30 nm | Pore volume [ml/g] width 0.3-1 nm |
|---|---|---|---|
| Carbon 1 | 1516 | 0.70 | 0.291 |
| Carbon 2 | 1361 | 0.10 | 0.285 |
| Carbon 3 | 2009 | 1.15 | 0.145 |
| Comparative Example | 1247* | 1.00* | 0.150* |

*mathematically determined by dividing the surface area or pore volume by the carbon content

Example 5: Measurement of Butane Isotherms

Butane isotherms were obtained for several adsorbent materials. A butane isotherm measurement measures the adsorbed amount of butane in a sample adsorbent material as a function of the partial pressure of butane at a constant temperature.

The butane isotherms were collected according to the following procedure. Butane gas was introduced incrementally into the evacuated sample, allowed to reach equilibrium and the adsorbed mass was measured. Specifically, a sample of material (about 0.1 g) was degassed under vacuum at 120° C. for 960 minutes, and the butane isotherm was measured using a 3Flex High Resolution High-throughput Surface Characterization Analyzer. The adsorptive test gas used was butane. During the analysis, a temperature of 298 K was maintained with a circulating bath of a water/ethylene glycol mixture. Low pressure dose amounts were 0.5 cc of butane gas per gram of sample (cc/g) up to 0.000000100 P/Po, and 3.0 cc/g up to 0.001 P/Po. An equilibration interval of 30 seconds was used up to 0.001 P/Po, and an equilibration interval of 10 seconds was used for the rest of the isotherm. The data for the comparative example was divided by the carbon content (31.8%) to obtain the capacity of just the carbon. The adsorbent materials tested by this procedure are listed below in Table 2.

TABLE 2

Adsorbent material properties

| Material | BET Surface Area (m²/g) |
|---|---|
| Carbon 1 | 1516 |
| Carbon 4 | 1480 |
| Carbon 5 | 2513 |
| Carbon 6 | 1365 |

Carbons 4, 5, and 6 were used as further comparative examples. Carbon 4 and Carbon 5 were commercially available active carbons marketed for use as canister carbons. These materials were received as extruded pellets and ground into powder with a mortar and pestle before testing. Carbon 6 was the activated carbon from an extruded honeycomb used in evaporative canister scrubber applications. The scrubber was ground into a powder with a mortar and pestle before testing. The test results were normalized by the carbon content of the scrubber material, which was measured to be 31.8% by LOI up to 1000° C.

Butane Isotherm Results

Figure 6A:
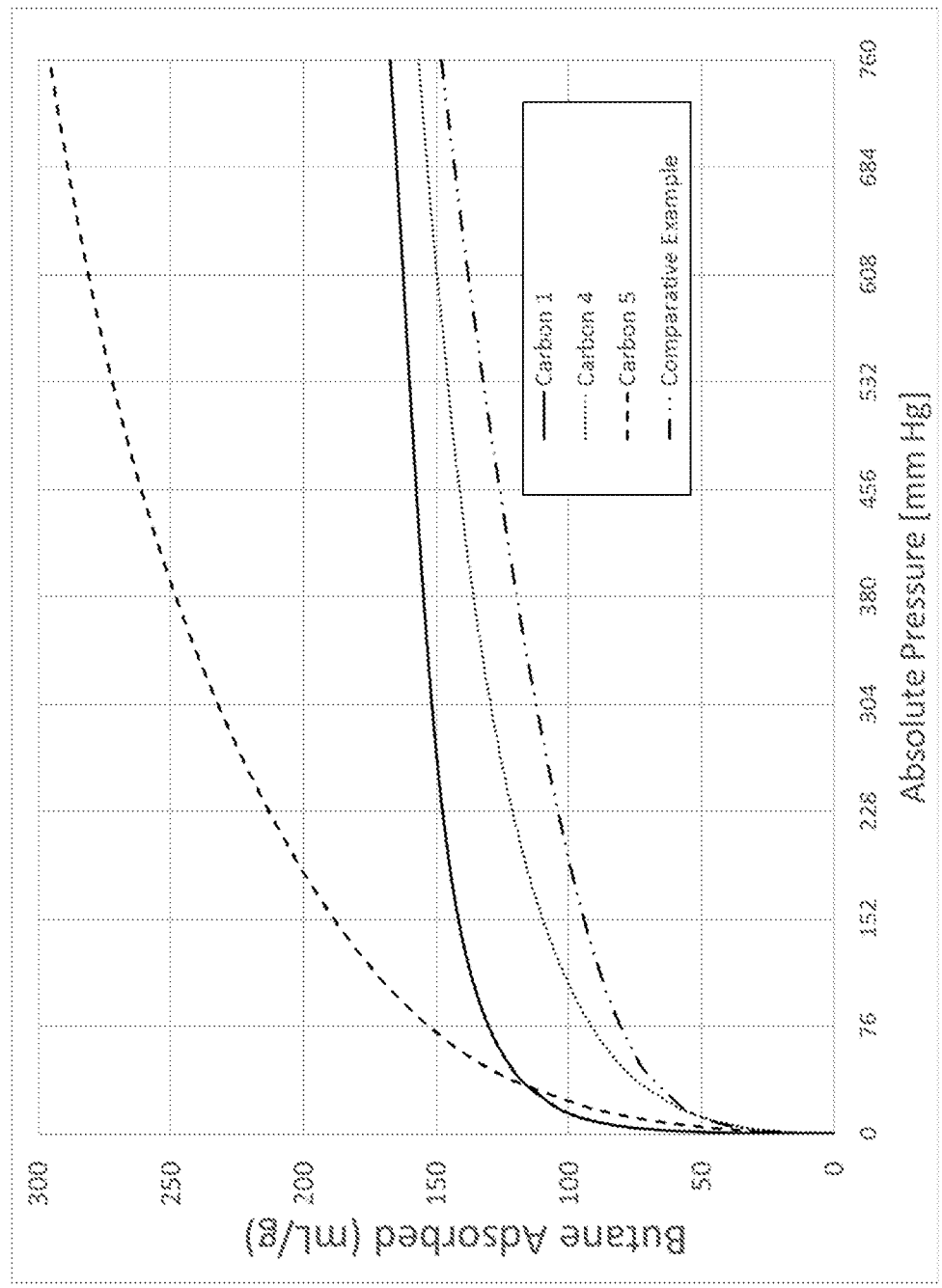
FIG. 6A is a first graph illustrating a butane isotherm for several particulate carbons.

The results of the butane isotherm measurements for these samples (carbons 1, 4, 5, and 6; carbon 6 is referred to as "Comparative Example" in FIGS. 6A-F) are provided in FIG. 6A. The data was plotted vs. the absolute pressure of butane in units of mm Hg. This data can be correlated to evaporative emission applications by defining the absolute partial pressure of butane at 760 mg Hg (i.e., atmospheric pressure) equal to a "butane percentage" of "100% butane" and plotting the adsorbed amount of butane vs. butane percentage, shown in FIG. 6B. The data was plotted up to a butane percentage of 50%, as this represents a relevant butane percentage for evaporative emission control application because the butane concentration typically used to measure the BWC of evaporative emission control devices (e.g., ASTM D5528, USCAR02) is 50% butane. A plot of the same data normalized in terms of the amount of butane adsorbed by the material as a fraction of the total amount of butane adsorbed at 50% butane is provided as FIG. 6C.

The relative amounts of butane adsorbed by these materials at lower butane percentages are of more relevance to certain evaporative emission applications, such as a hydrocarbon adsorber (HCA) used to reduce evaporative emissions originating from the air intake system (AIS) of a vehicle during a SHED test. Estimated vapor concentrations that a typical HCA would experience during a SHED test are on the order of ~5% butane, depending on the size of the air cleaner housing. The vapor concentration that a scrubber experiences during the diurnal portion of a BETP test is on the order of 0.5% butane. Therefore, without wishing to be bound by theory, a material with an isotherm shape that is initially comparatively steep at low butane percentages up to 5% butane, and flatter between butane percentages of 5% butane and 50% butane, would be expected to perform better in these applications.

FIG. 6D depicts the amount of butane adsorbed by these materials at 50% butane measured by the butane isotherm. These values were determined by reading the value for each material in FIG. 6B at 50% butane.

Figure 6B:
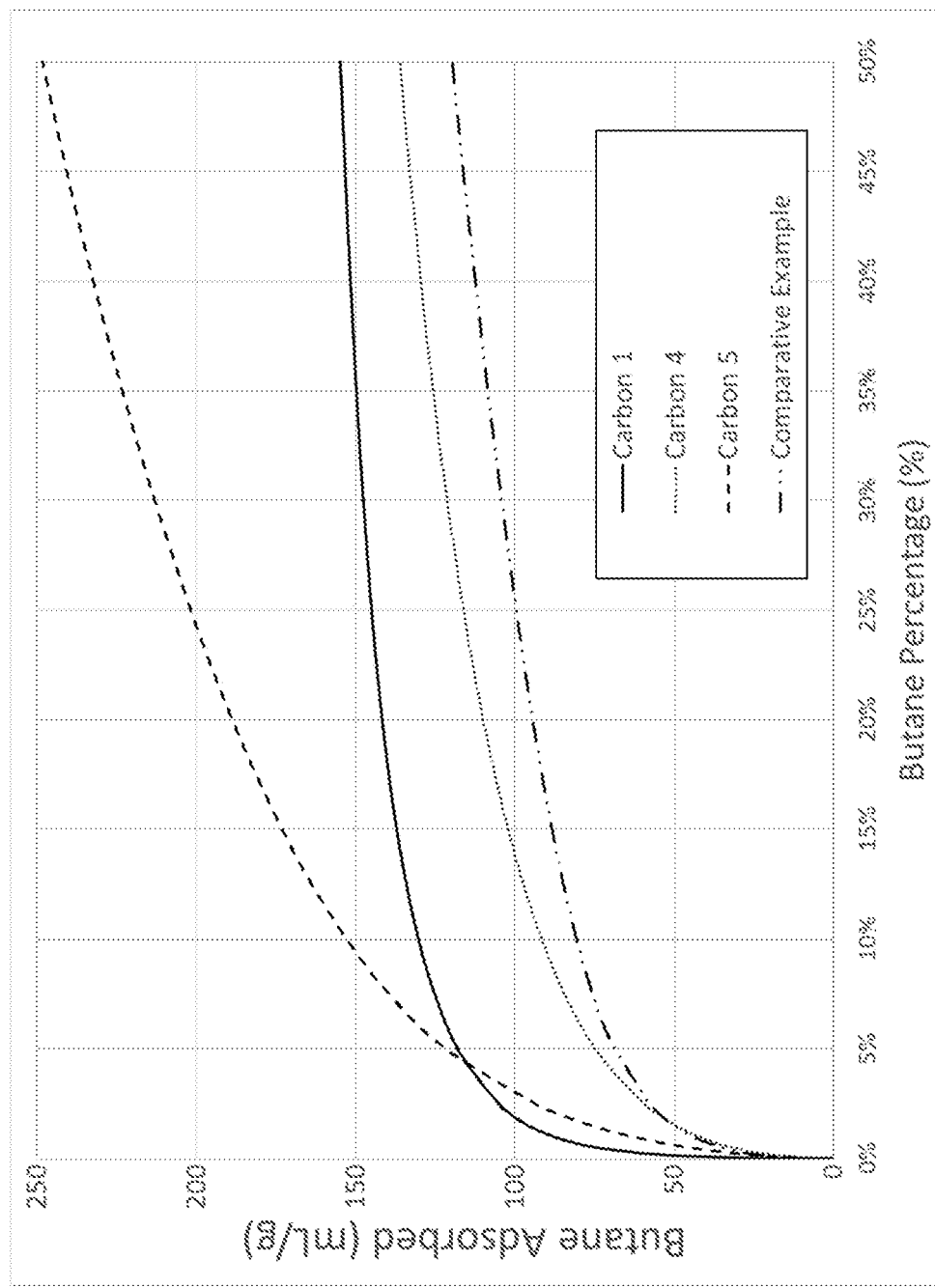
FIG. 6B is a second graph illustrating a butane isotherm for several particulate carbons.
Figure 6C:
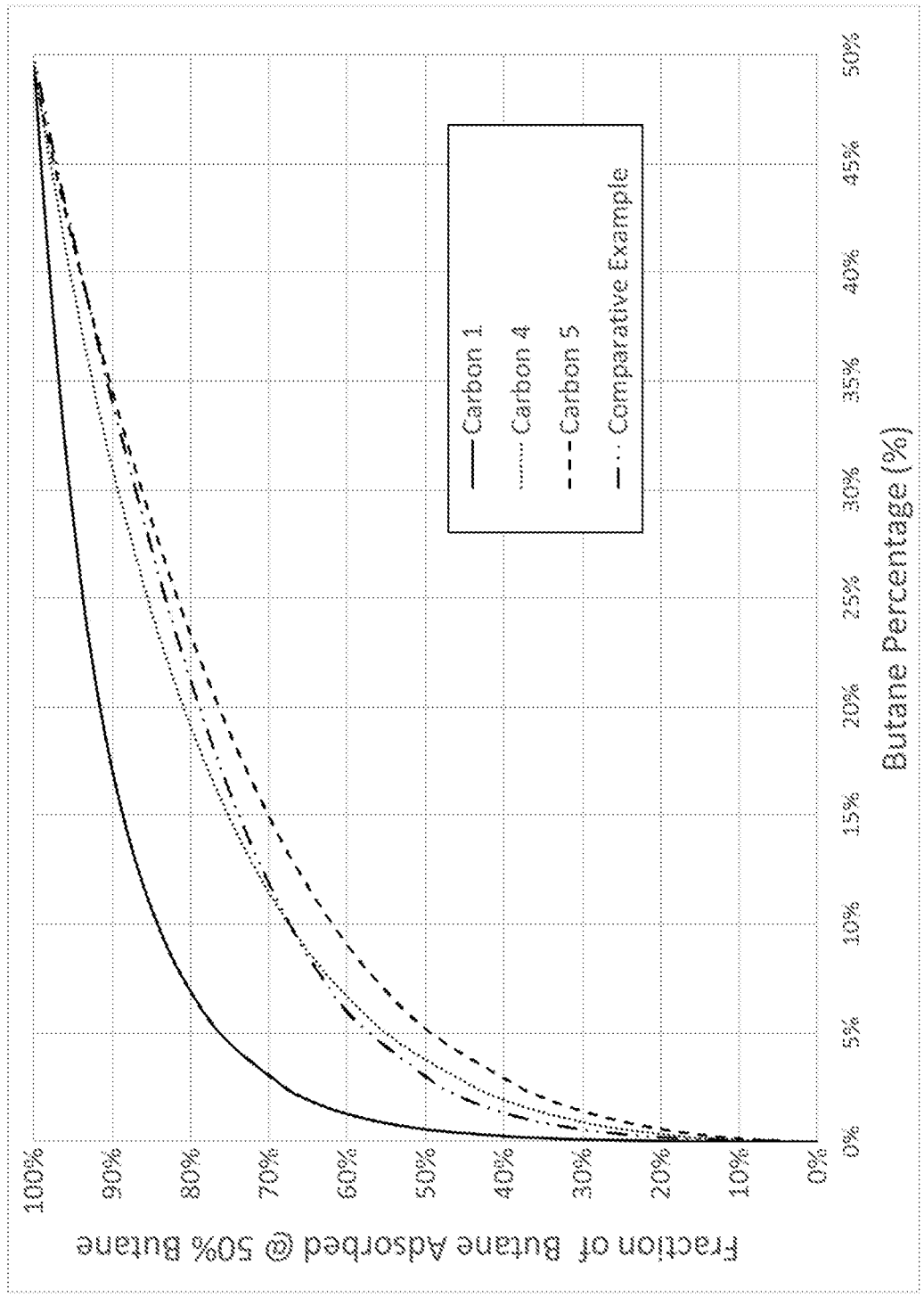
FIG. 6C is a third graph illustrating a butane isotherm for several particulate carbons.
Figure 6E:
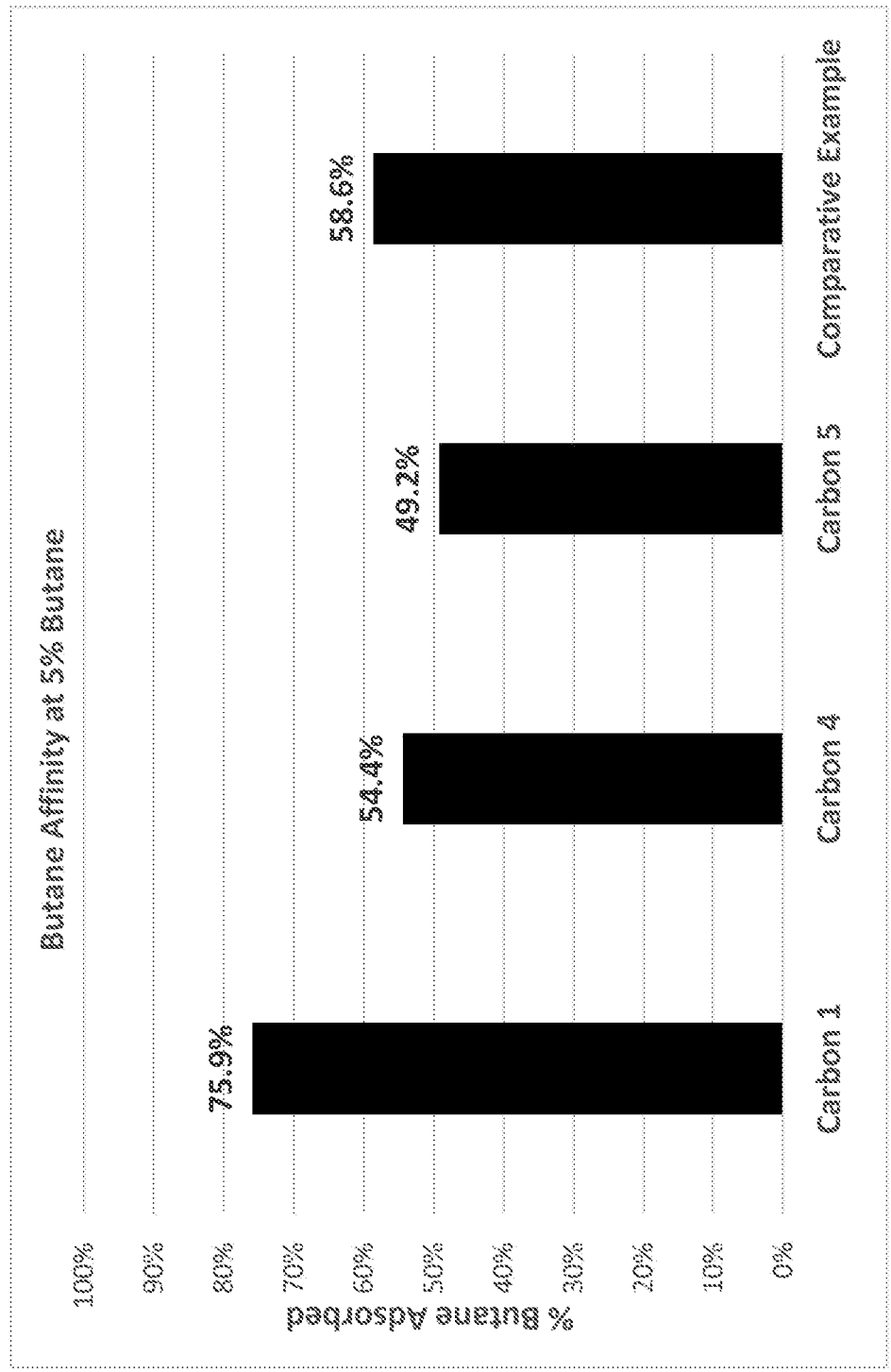
FIG. 6E is a first graph illustrating butane affinity for several particulate carbons.
Figure 6F:
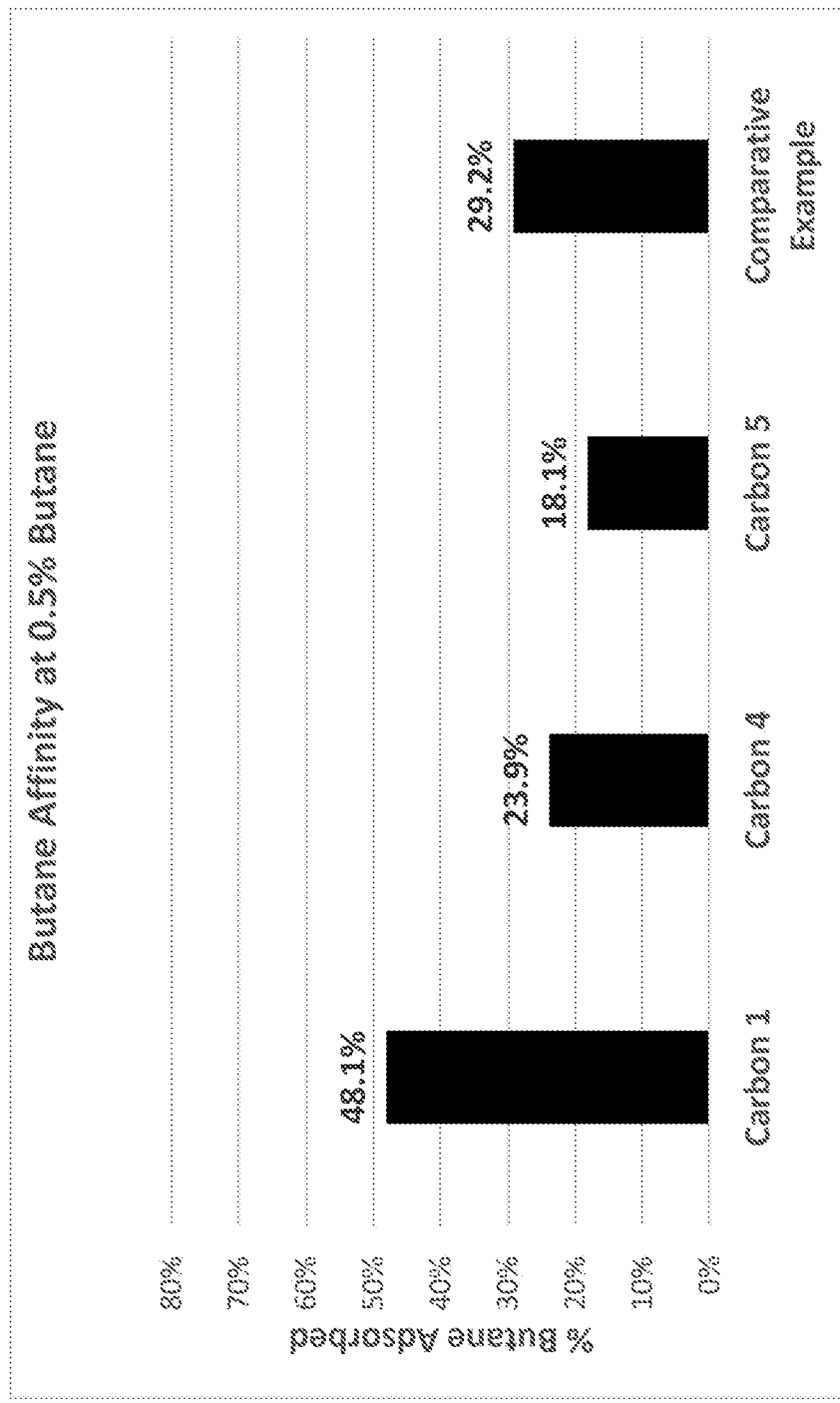
FIG. 6F is a second graph illustrating butane affinity for several particulate carbons.

FIGS. 6E and 6F provide the relative amounts that these materials adsorb at 5% and 0.5% butane as a fraction of the amount that material adsorbs at 50% butane. These values were defined as the Butane Affinity for these materials at butane concentrations of 5% and 0.5%, respectively. The Butane Affinity for each material was determined by reading the value for each material at butane concentrations of 5% and 0.5% from FIG. 6C. Specifically, the Butane Affinity was calculated by setting the absolute partial pressure of butane at 760 mg Hg (i.e., atmospheric pressure) equal to a "Butane Percentage" of 100% and then plotting the adsorbed amount of butane vs. butane percentage as represented in FIG. 6B. The data curve was then normalized by plotting the amount of butane adsorbed as a fraction of the amount of butane adsorbed at a Butane Percentage of 50% as represented in FIG. 6C. The Butane Affinity at 0.5% and 5% butane was then determined from this plot by reading the fraction of butane adsorbed at 50% at these butane concentrations. In other words, the Butane Affinity of the material at 5% and 0.5% respectively was the percentage of the butane that the material adsorbed at butane partial pressures of 38 mm Hg and 3.8 mmHg, respectively, compared to the amount of butane that the material adsorbed at 380 mm Hg as determined by the butane isotherm measurement.

Based on the data in FIG. 6D alone, Carbon 1 would not be expected to have particularly advantageous performance in AIS and scrubber applications because it has butane adsorption capacities similar to or lower than the other carbons. However, the Butane Affinity at both 5% butane and 0.5% butane, as shown in FIGS. 6E and 6F, demonstrated that this material had an advantage over other materials used for evaporative emission control. A Butane Affinity at 5% of >60% (exhibited by Carbon 1; FIG. 6E) is unique and unexpected when compared to standard evaporative adsorbent materials, and is expected to result in improved evaporative emission capture efficiency. A Butane Affinity at 0.5% of >35% (exhibited by Carbon 1; FIG. 6F) is unique and unexpected when compared to standard evaporative adsorbent materials, and is expected to result in improved evaporative emission capture efficiency. Accordingly, utilizing such materials in these applications would be expected to provide better evaporative performance than standard adsorbents, or use less of such materials and still exhibit equivalent performance.

Example 6: Measurement of Butane Adsorption Capacity

A commercial carbon monolith (Comparative Example) and several coated monoliths (Examples 1-3), were tested in a butane absorption-desorption setup.

The 29×100 mm size cylindrical samples were placed inside a cylindrical sample cell oriented in the vertical direction. The sample cell was then loaded with a 1:1 butane/$N_2$ test gas flow rate of 134 mL/min (10 g/hour of butane flow) for 45 minutes. The direction of flow was upward from the bottom of the sample cell to the top. The gas composition of the outlet flow from the sample cell was monitored by an FID (Flame Ionization Detector).

After the 45 minute butane adsorption step, the sample cell was purged with $N_2$ at 100 mL/min for 10 minutes in the same flow direction. The sample was then desorbed with a 10 L/min flow of air in the opposite direction (top to bottom) for 15 minutes. In the following step the gas composition was switched to a mixture of 0.5% butane/$N_2$ at 134 ml/min (0.1 g butane per hour) and loading step was repeated. The breakthrough curve was recorded using the FID described above and the signal was plotted against the cumulative mass of butane flowing.

Figure 7:
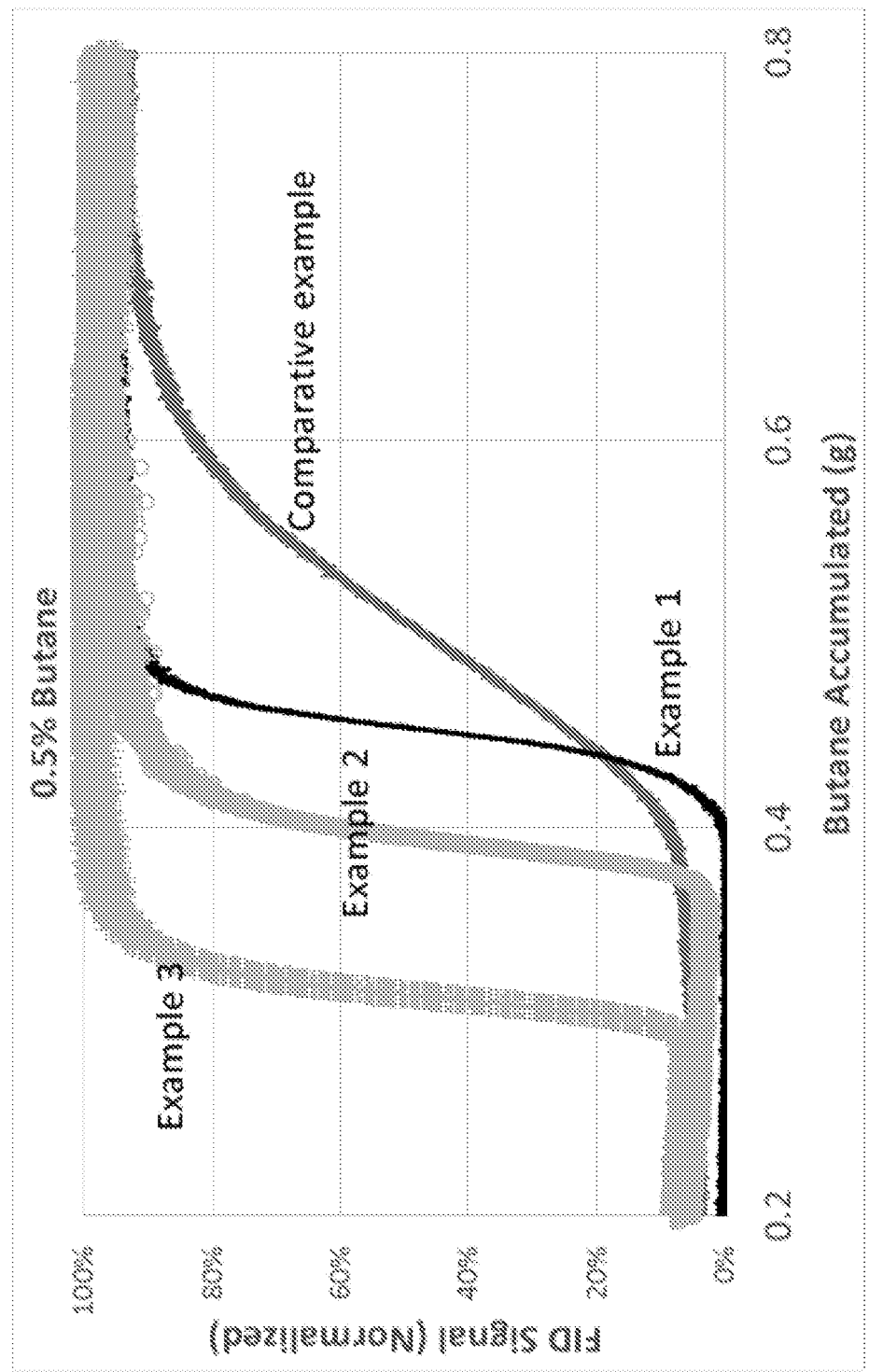
FIG. 7 is a graph illustrating butane breakthrough curves for several particulate carbons.

The relative effective butane adsorption capacity can be correlated to the time it takes for butane breakthrough to occur through the sample. Butane breakthrough was defined as the time at which the outlet concentration of butane from the sample cell reached 25% of the saturation concentration. In this test set-up, it was apparent (FIG. 7) that only Example 1 (using carbon 1) provided comparable adsorption capacity to the commercial reference (Comparative Example). These results demonstrated a dependence on the surface area, micropore volume, and shape of the butane isotherm.

Among the materials tested (Examples 1-3 and the Comparative Example), only Example 1 exhibited a breakthrough point that was comparable or superior to that of the Comparative Example. Without wishing to be bound by theory, this was believed to have been achieved through the combination of high micropore volume at pore sizes of 0.3-1 nm and high mesopore volume at pore sizes 1-30 nm. The relevant parameters are summarized in Table 3. The desired combination of high micropore volume, high mesopore volume, and high adsorption capacity at low partial pressure of butane was only achieved by the carbon in Example 1 (Carbon 1). The resulting breakthrough point was the highest for this carbon.

TABLE 3

Parameters associated with good performance of adsorptive carbon-coated substrates.

| Carbon | Micropore volume 0.3-1 nm [ml/g] | Mesopore volume 1-30 nm [ml/g] | Adsorbed butane at 3 mm Hg butane pressure [ml/g] | Breakthrough point (20% of feed concentration) [g butane] |
|---|---|---|---|---|
| Carbon 1 | 0.291 | 0.70 | 74 | 0.44 |
| Carbon 2 | 0.285 | 0.10 | 68 | 0.38 |
| Carbon 3 | 0.145 | 1.15 | 39 | 0.30 |

Example 7: BETP Test of Evaporative Emission Control Canister with Scrubber Prepared According to Example 1

BETP Test on 1.9 L Canisters

Two 1.9 L automotive canisters were tested according to the California Bleed Emission Test Procedure (BETP). These canisters contained two separate carbon beds. Both beds of this canister were filled with Ingevity BAX 1500 carbon. The first carbon bed was approximately twice the volume of the second carbon bed. The canister also had an internal chamber for a scrubber. Prior to the test, a scrubber that had been prepared according to Example 1 was installed in the scrubber chamber of one of the canisters and the scrubber chamber of the other canister was left empty.

BETP Test Procedure

The published procedure "USCAR Advanced Powertrain Technical Leadership Council: Advanced Evaporative Technical Partnership; USCAR LEVIII/Tier 4 BETP Recommended Procedure Based on Published Regulations" (May 23, 2014) was employed. Gasoline fuel vapor (EPA test fuel) and dry nitrogen (1:1 fuel vapor/$N_2$ ratio) was loaded into each canister at a load rate of 40 g/hour until 2 g of fuel vapor breakthrough was detected, followed by a purge of dry air at 22.7 L/min for 300 bed volumes. This procedure was repeated for a total of 10 load/purge cycles. The canister was then loaded with butane (1:1 in nitrogen) to 2 g of breakthrough and allowed to soak for 1 hour. The canister was then purged at 22.7 L/min 40% RH air at 25° C. until the canister lost 76.8 g of mass, equivalent to 135 bed volumes. The canister was then connected to a 14.5-gallon fuel tank that had been filled 40% full with CARB Phase III fuel and soaked for 6 hours at 65° F. The purge port of the canister was capped and the system was soaked for 12 hours at 65° F. The system was then cycled between 65° F. and 105° F. with a 12-hour ramp time for a total of two diurnal cycles (48 hours total). The canister outlet was open to an evaporative emission measurement enclosure to monitor the evaporative emissions that escaped from the canister. The highest hydrocarbon emission for each 24-hour period was reported.

The highest day diurnal emissions were 275 mg for the canisters with no scrubber, but only 9 mg with the canister with the scrubber prepared according to Example 1. For both canisters, the highest day of emissions was the second day. This result demonstrated that a scrubber prepared according to Example 1 can enable an automotive carbon canister to pass the <20 mg emission limit of the California Bleed Emission Test Procedure (BETP).

BETP Test on a 2.5 L Canister

A 2.5 L automotive canister was tested according to the California Bleed Emission Test Procedure (BETP). This canister contained two separate carbon beds. Both beds of this canister were filled with Ingevity BAX 1500 carbon. The first carbon bed was approximately twice the volume of the second carbon bed. The canister did not have an internal chamber for a scrubber. To include a scrubber on this canister, a scrubber that had been prepared according to Example 1 was placed in a separate housing and attached to the vent side port of the canister with a hose clamp and leak tested to ensure that it was sealed. The canister was tested according to the BETP test procedure as described above, with the exception that the canister was purged with 80 bed volumes of air after the butane load step. The highest day diurnal emission was 3 mg for this canister. The highest day of emission was the second day. This result demonstrated that a scrubber prepared according to Example 1 can enable an automotive carbon canister to pass the <20 mg emission limit of the California Bleed Emission Test Procedure (BETP).

What is claimed is:

1. A bleed emission scrubber, the scrubber comprising:
no more than one adsorbent volume comprising a coated substrate adapted for hydrocarbon adsorption, the coated substrate comprising a substrate having at least one surface, and a coating on the at least one surface, the coating comprising particulate carbon and a binder,
wherein the adsorbent volume has a g-total butane working capacity (BWC) of 0.1 grams to less than 2 grams, the g-total BWC being computed based on the total scrubber adsorbent volume and ASTM D5228 as of Jul. 16, 2018,
wherein the particulate carbon has a BET surface area of at least about 1300 $m^2$/gram,
wherein the particulate carbon has at least one of:
i. a butane affinity of greater than 60% at 5% butane;
ii. a butane affinity of greater than 35% at 0.5% butane; or
iii. a micropore volume greater than about 0.2 ml/g and a mesopore volume greater than about 0.5 ml/g.

2. The bleed emission scrubber of any of claim 1, wherein the adsorbent volume has a g-total BWC of from about 0.2 grams to about 1.6 grams.

3. The bleed emission scrubber of claim 1, wherein the particulate carbon has an n-butane adsorption capacity of at least about 40 ml/g at about 3 mm Hg n-butane pressure.

4. The bleed emission scrubber of claim 1, wherein the particulate carbon has a BET surface area of from about 1300 $m^2$/g to about 2500 $m^2$/g.

5. The bleed emission scrubber of claim 1, wherein the particulate carbon has a micropore volume of from about 0.20 ml/g to about 0.35 ml/g.

6. The bleed emission scrubber of claim 1, wherein the particulate carbon has a mesopore volume of from about 0.5 ml/g to about 0.8 ml/g.

7. The bleed emission scrubber of claim 1, wherein the particulate carbon has a mesopore volume of from about 0.5 ml/g to about 0.75 ml/g.

8. The bleed emission scrubber of claim 1, wherein the particulate carbon has a mesopore volume of from about 0.6 ml/g to about 0.65 ml/g.

9. The bleed emission scrubber of claim 1, wherein the particulate carbon has a mesopore volume of from about 0.7 ml/g to about 0.75 ml/g.

10. The bleed emission scrubber of claim 1, wherein the particulate carbon has a BET surface area of about 1400 $m^2$/gram, a micropore volume of about 0.3 ml/g, and a mesopore volume of about 0.75 ml/g.

11. The bleed emission scrubber of claim 1, wherein the substrate is selected from the group consisting of foams, monolithic materials, non-wovens, wovens, sheets, papers, twisted spirals, ribbons, structured media of extruded form, structured media of wound form structured media of folded form, structured media of pleated form, structured media of corrugated form, structured media of poured form, structured media of bonded form, and combinations thereof.

12. The bleed emission scrubber of claim 1, wherein the substrate is a monolith.

13. The bleed emission scrubber of claim 12, wherein the monolith is a ceramic.

14. The bleed emission scrubber of claim 1, wherein the substrate is a plastic.

15. The bleed emission scrubber of claim 14, wherein the plastic is selected from the group consisting of polypropylene, nylon-6, nylon-6, 6, aromatic nylon, polysulfone, polyether sulfone, polybutylene terephthalate, polyphthalamide, polyoxymethylene, polycarbonate, polyvinylchloride, polyester, and polyurethane.

16. The bleed emission scrubber of claim 1, wherein the coating thickness is less than about 500 microns.

17. The bleed emission scrubber of claim 1, wherein the binder is present in an amount from about 10% to about 50% by weight relative to the particulate carbon.

18. The bleed emission scrubber of claim 1, wherein the binder is an organic polymer.

19. The bleed emission scrubber of claim 1, wherein the binder is an acrylic/styrene copolymer latex.

20. An evaporative emission control canister system comprising:

a canister, a fuel vapor purge tube for connecting the canister to an engine, a fuel vapor inlet conduit for venting a fuel tank to the canister, and a vent conduit for venting the canister to the atmosphere and for admission of purge air to the canister; and the bleed emission scrubber of claim 1, wherein the bleed emission scrubber is in fluid communication with the canister; and wherein the evaporative emission control system is configured to permit sequential contact of the canister and the bleed emission scrubber by the fuel vapor.

* * * * *